United States Patent
Larcher et al.

(10) Patent No.: US 9,592,498 B2
(45) Date of Patent: Mar. 14, 2017

(54) POROUS INORGANIC COMPOSITE OXIDE

(75) Inventors: Olivier Larcher, Pennington, NJ (US); Francis Francis, Columbia, MD (US); Thomas English, Parkesburg, PA (US); Simon Ifrah, La Jarrie (FR); Andrew Polli, Washington Crossing, PA (US)

(73) Assignee: Rhodia Operations, Aubervilliers (FR)

( * ) Notice: Subject to any disclaimer, the term of this patent is extended or adjusted under 35 U.S.C. 154(b) by 798 days.

(21) Appl. No.: 13/373,518

(22) Filed: Nov. 16, 2011

(65) Prior Publication Data

US 2012/0129690 A1    May 24, 2012

Related U.S. Application Data

(60) Provisional application No. 61/458,035, filed on Nov. 16, 2010.

(51) Int. Cl.
*B01J 21/04* (2006.01)
*B01J 37/03* (2006.01)
(Continued)

(52) U.S. Cl.
CPC .......... *B01J 37/038* (2013.01); *B01D 53/945* (2013.01); *B01J 21/12* (2013.01); *B01J 23/38* (2013.01); *B01J 23/44* (2013.01); *B01J 23/63* (2013.01); *B01J 35/1019* (2013.01); *B01J 35/1047* (2013.01); *B01J 35/1061* (2013.01); *B01J 37/0045* (2013.01); *B01D 2255/102* (2013.01); *B01D 2255/2063* (2013.01);
(Continued)

(58) Field of Classification Search
USPC .......................................... 502/302, 349, 355
See application file for complete search history.

(56) References Cited

U.S. PATENT DOCUMENTS 4,456,701 A    6/1984  Chen
5,102,850 A    4/1992  Sanchez
(Continued)

FOREIGN PATENT DOCUMENTS

CN    100360222 C    1/2008
EP       715879 A1    6/1996
(Continued)

OTHER PUBLICATIONS

Qi et al., MnOx—CeO2 mixed oxides prepared by co-precipitation for selective catalytic reduction of NO with NH3 at low temperatures, Applied Catalysis B: Environmental 51 (2004) 93-106.*

*Primary Examiner* — Melvin C Mayes
*Assistant Examiner* — Stefanie Cohen

(57) ABSTRACT

A porous inorganic composite oxide containing oxides of aluminum and of cerium and/or zirconium, and, optionally, oxides of one or more dopants selected from transition metals, rare earths, and mixtures thereof, and having a specific surface area, in $m^2/g$, after calcining at 1100° C. for 5 hours, of $\geq 0.8235[Al]+11.157$ and a total pore volume, in $cm^3/g$, after calcining at 900° C. for 2 hours, of $\geq 0.0097$ [Al]+0.0647, wherein [Al] is the amount of oxides of aluminum, expressed as pbw $Al_2O_3$ per 100 pbw of the composite oxide; a catalyst containing one or more noble metals dispersed on the porous inorganic composite oxide; and a method for making the porous inorganic composite oxide.

11 Claims, 16 Drawing Sheets

(51) Int. Cl.

| | | |
|---|---|---|
| *B01J 21/12* | (2006.01) | |
| *B01J 23/38* | (2006.01) | |
| *B01J 23/44* | (2006.01) | |
| *B01J 23/63* | (2006.01) | |
| *B01J 35/10* | (2006.01) | |
| *B01J 37/00* | (2006.01) | |
| *B01D 53/94* | (2006.01) | |
| *B01J 37/04* | (2006.01) | |
| *B01J 21/06* | (2006.01) | |
| *B01J 23/42* | (2006.01) | |
| *B01J 37/08* | (2006.01) | |

(52) U.S. Cl.
CPC .. *B01D 2255/2092* (2013.01); *B01D 2255/30* (2013.01); *B01D 2255/9205* (2013.01); *B01D 2255/9207* (2013.01); *B01J 21/063* (2013.01); *B01J 21/066* (2013.01); *B01J 23/42* (2013.01); *B01J 37/031* (2013.01); *B01J 37/04* (2013.01); *B01J 37/08* (2013.01); *Y02T 10/22* (2013.01)

(56) References Cited

U.S. PATENT DOCUMENTS

| | | | |
|---|---|---|---|
| 5,128,306 | A | 7/1992 | Dettling |
| 5,449,852 | A | 9/1995 | Chauvin et al. |
| 5,607,892 | A | 3/1997 | Chopin |
| 5,883,037 | A | 3/1999 | Chopin et al. |
| 5,958,827 | A | 9/1999 | Suda et al. |
| 6,150,288 | A | 11/2000 | Suzuki et al. |
| 6,214,306 | B1 | 4/2001 | Aubert et al. |
| 6,326,329 | B1 | 12/2001 | Nunan |
| 6,335,305 | B1 | 1/2002 | Suzuki et al. |
| 6,355,220 | B1 | 3/2002 | Blanchard et al. |
| 6,369,276 | B1 | 4/2002 | Warren |
| 6,506,705 | B2 | 1/2003 | Blanchard et al. |
| 6,548,032 | B1 | 4/2003 | Barthe et al. |
| 6,762,147 | B2 | 7/2004 | Morikawa et al. |
| 7,939,041 | B2 | 5/2011 | Darab |
| 2006/0263284 | A1 | 11/2006 | Larcher et al. |
| 2007/0179054 | A1 | 8/2007 | Akamine et al. |
| 2008/0187476 | A1 | 8/2008 | Larcher et al. |
| 2008/0269046 | A1* | 10/2008 | Minoshima .......... B01D 53/945 502/304 |
| 2009/0023581 | A1 | 1/2009 | Di Monte et al. |
| 2009/0099013 | A1 | 4/2009 | Morikawa et al. |
| 2010/0285956 | A1 | 11/2010 | Li |

FOREIGN PATENT DOCUMENTS

| | | |
|---|---|---|
| EP | 1 172 139 A1 | 1/2002 |
| EP | 1 287 876 B1 | 5/2006 |
| EP | 2 036 606 A | 3/2009 |
| EP | 2 036 606 A1 | 3/2009 |
| EP | 2 036 607 A1 | 3/2009 |
| JP | 10202102 A | 8/1998 |
| JP | H10-258231 A2 | 9/1998 |
| JP | H11-019514 A | 1/1999 |
| JP | 11130436 A | 5/1999 |
| JP | 2000288391 A | 10/2000 |
| JP | 2004141781 A | 5/2004 |
| JP | 2006341176 A | 12/2006 |
| JP | 2007268470 A | 10/2007 |
| WO | 9730787 A1 | 8/1997 |
| WO | 9743035 A1 | 11/1997 |
| WO | 9845027 A1 | 10/1998 |
| WO | 2006070201 A2 | 7/2006 |
| WO | 2006070203 A1 | 7/2006 |

* cited by examiner

POROUS INORGANIC COMPOSITE OXIDE

FIELD OF THE INVENTION

This invention relates to a porous inorganic composite oxide that is useful for treating of exhaust gases from internal combustion engines.

BACKGROUND OF THE INVENTION

The exhaust products of internal combustion engines are known health hazards to human beings, animals as well as plant life. The pollutants are, in general, non-burnt hydrocarbons, carbon monoxide, nitrogen oxides, as well as residual amounts of sulfur and sulfurous compounds. Exhaust catalysts have to meet stringent requirements with respect to light-off performance, effectiveness, long-term activity, mechanical stability as well as cost effectiveness in order to be suitable for vehicle application. The pollutants of non-burnt hydrocarbons, carbon monoxides as well as nitrogen oxides have been successfully treated by contact with multifunctional, noble metal catalysts which are capable of converting a high percentage of the pollutants into less harmful products of carbon dioxide, water (steam) and nitrogen. However, the sulfur and sulfurous compounds present in fuels and, in turn, in exhaust product, have been known to poison the noble metals resulting in lessening their catalytic effectiveness and life.

The "catalytic converter" used to convert the harmful pollutants into non-harmful gases, usually consists of three components, that is, the catalytically active metal, the support on to which the active metal is dispersed, and a substrate on to which the support is applied or "washcoated".

The catalytic metals that are useful to cause effective conversion of harmful pollutants, like carbon monoxide, nitrogen oxides, and non-burnt hydrocarbons under the varying conditions encountered, are noble metals, usually the metals of the platinum group, such as platinum, palladium, rhodium and mixtures thereof. These noble metal catalysts are well known in the art and are more fully described in, for example, DE-05 38 30 318.

The noble metal is typically supported on high surface area inorganic oxides, such as high surface area alumina particles. The high surface area alumina is applied or "washcoated" onto a ceramic or metallic substrate, such as in the form of a honeycomb monolith or wire mesh or the like structure. It is also possible to apply the noble metals onto the support after washcoating the support material onto the monolith.

U.S. Pat. No. 6,335,305 discloses a catalyst that comprises an inorganic oxide support and a noble metal loaded on the support, wherein the support comprises a porous oxide and a composite oxide of the formula $(Al_2O_3)_a(CeO_2)_b(ZrO_2)_{1-b}$, wherein a is from 0.4 to 2.5 and b is from 0.2 to 0.7.

EP 2 036 606 and EP 2 036 607 describe inorganic oxides comprising aluminum oxide, a metal oxide that does not form a composite oxide with aluminum oxide and at least one additional element selected from rare earth elements and alkaline earth elements useful as a catalyst for treating exhaust gases that is disclosed as having excellent heat resistance.

It is desired to form a porous inorganic composite oxide that exhibits improved heat thermal stability and improved phase stability at elevated temperature.

SUMMARY OF THE INVENTION

In a first aspect, the present invention is directed to a porous inorganic composite oxide, comprising oxides of aluminum and cerium, or oxides of aluminum and zirconium, or oxides of aluminum, cerium, and zirconium, and, optionally, oxides of one or more dopants selected from transition metals, rare earths, and mixtures thereof, said inorganic composite oxide having:
(a) a specific surface area after calcining at 1100° C. for 5 hours of greater than or equal to that calculated according to Equation (2):

$$SA=0.8235[Al]+11.157 \quad \text{(Eq. 2)}$$

wherein:
SA is the BET specific surface area of the inorganic composite oxide, in square meters per gram, and
[Al] is the amount of oxides of aluminum in the composite oxide, expressed as pbw $Al_2O_3$ per 100 pbw of the composite oxide, and
(b) a total pore volume after calcining at 900° C. for 2 hours of greater than or equal to that calculated according to Equation (4.1):

$$PV=0.0097[Al]+0.0647 \quad \text{(Eq. 4.1)}$$

wherein:
PV is the pore volume of the inorganic composite oxide, in cubic centimeters per gram, and
[Al] is as defined above in regard to Equation (2).

In a second aspect, the present invention is directed to a catalyst, comprising one or more noble metals dispersed on the above described porous inorganic composite oxide.

In a third aspect, the present invention is directed to a method for making a porous inorganic composite oxide, comprising:
(a) forming (i) particles comprising aluminum hydrate and (ii) particles comprising zirconium hydrate, or particles comprising cerium hydrate, or particles comprising zirconium hydrate and cerium hydrate, in an aqueous medium:
  (1) sequentially by:
    (1.1) forming particles of aluminum hydrate in the aqueous medium at a temperature of greater than 50° C.,
    (1.2) after step (a)(1.1), adjusting the pH of the aqueous medium to a pH of from 4 to 6, and
    (1.3) after step (a)(1.2), forming the particles comprising zirconium hydrate, particles comprising cerium hydrate, or particles comprising zirconium hydrate and cerium hydrate in the aqueous medium or
  (2) simultaneously by forming the (i) particles comprising aluminum hydrate and (ii) particles comprising zirconium hydrate, or particles comprising cerium hydrate, or particles comprising zirconium hydrate and cerium hydrate in an aqueous medium at a temperature of greater than 50° C.
(b) isolating the particles made in step (a) from the aqueous medium,
(c) drying the isolated particles, and
(d) calcining the dried particles,
to form the porous inorganic composite oxide.

In its various embodiments, the porous inorganic composite oxide of the present invention provides improved thermal stability, as well as increased pore volume, improved phase purity, improved phase stability, and improved localization of mixed zirconium cerium oxide regions.

DETAILED DESCRIPTION OF THE INVENTION

Figure 1:
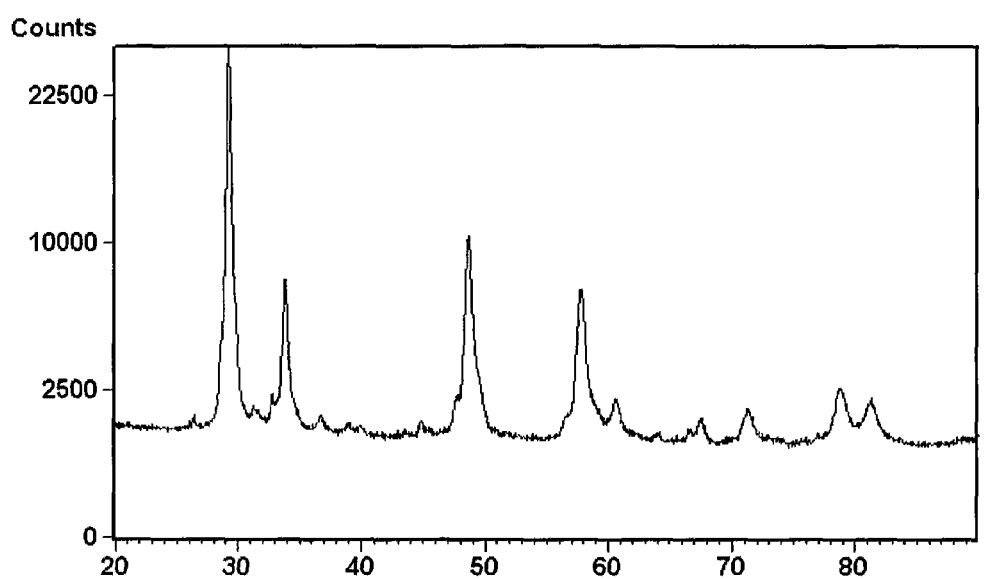
FIG. 1 shows an X-Ray diffractogram of the composition of Example 1 after calcination at 1200° C. for 10 hours. In each case, the X-ray diffractograms provided herein show a plot of diffracted intensity (as number of counts) versus 2 theta angle (in degrees over a range between 20 to 90 degrees).

The following terms, used in the present description and the appended claims, have the following definitions:

As used herein, the term "particulate" refers to shaped particles in the form of powder, beads, extradite, and the like. In this teaching, it is used in reference to cores, supports as well as the resultant supported noble metal products.

As used herein, "inorganic composite oxide" means an inorganic oxide material that comprises at least two distinct crystallographic phases by X-ray diffraction.

As used herein, the term "nanoparticles" means primary particles having a particle diameter of up to about 500 nm, more typically from about 1 to about 100 nm, and even more typically from about 1 to about 50 nm. The relevant particle sizes can be calculated based on x-ray diffraction data or determined by observation using a transmission electron microscope.

As used herein the terminology "primary particle" means a single discrete particles and the terminology "secondary particle" means an agglomerate of two or more primary particles. A reference to "particles" that does not specify "primary" or "secondary" means primary particles, or secondary particle, or primary particles and secondary particles.

As used herein, the term "alumina" refers to any of the forms of aluminum oxide alone or as a mixture with other metals and/or metal oxides.

As used herein, the term "adsorbed" or "adsorption" shall refer collectively to the phenomena of adsorption (the ability to hold or concentrate gases, liquid or dissolved substances on the surface of the adsorbent, e.g. alumina), and absorption (the ability to hold or concentrate gases, liquids or dissolved substances throughout the body of the absorbent, e.g. alumina); either by chemical reaction which may be ionic, covalent or of mixed nature or by physical forces.

As used herein to describe the relative amount of a given component of a given composition, the terminology "parts by weight" of the component on the basis of 100 pbw of the given composition is equivalent to a "percent by weight" of the component on the basis of the total weight of the given composition. For example, a reference to 10 pbw of a given component per 100 pbw of a given composition is equivalent in meaning to a reference 10 wt % of the component in the composition.

Unless otherwise indicated, the relative amounts of the respective oxides of aluminum, cerium, zirconium, and respective dopant elements of the composite oxide composition of the present invention are each expressed on the basis of the discrete binary oxide of the respective element (for example, for aluminum as $Al_2O_3$, for zirconium as $ZrO_2$, for cerium as $CeO_2$, for yttrium as $Y_2O_3$, for lanthanum as $La_2O_3$, for neodymiun as $Nd_2O_3$, for praseodymium as $Pr_6O_{11}$, and for gadolinium as $Gd_2O_3$).

The aluminum oxide component of the inorganic oxide of the present invention may be amorphous or crystalline. In one embodiment, the composite oxide of the present invention comprises one or more oxides of aluminum in an amount, expressed as pbw $Al_2O_3$ per 100 pbw of the composite oxide, from about 20 to 90 pbw, more typically from about 25 to 80 pbw, and even more typically, from about 30 to 70 pbw, $Al_2O_3$.

In one embodiment, the inorganic composite oxide of the present invention further comprise oxides of zirconium, oxides of cerium, or oxides of zirconium and cerium In one embodiment, the inorganic composite oxide of the present invention further comprises one or more oxides of zirconium, such as $ZrO_2$. In one embodiment, the inorganic composite oxide of the present invention further comprises one or more oxides of cerium, such as $CeO_2$. In one embodiment, the inorganic composite oxide further comprises one or more oxides of zirconium and one or more oxides of cerium.

In one embodiment, the composite oxide of the present invention comprises one or more oxides of zirconium, in an amount, expressed as pbw $ZrO_2$ per 100 pbw of the composite oxide, from about 2 to 80 pbw, more typically from about 5 to 70 pbw, and even more typically, from about 10 to 60 pbw, $ZrO_2$.

In one embodiment, the composite oxide of the present invention comprises one or more oxides of cerium, in an amount expressed as pbw $CeO_2$ per 100 pbw of the composite oxide from about 2 to 80 pbw, more typically from about 5 to 70 pbw, and even more typically, from about 10 to 60 pbw, $CeO_2$.

In one embodiment, the composite oxide of the present invention comprises one or more oxides of zirconium and cerium, each in an amount expressed as pbw $ZrO_2$ or pbw $CeO_2$ per 100 pbw of the composite oxide of:

from about 2 to 78 pbw, more typically from about 5 to 75 pbw, even more typically from about 10 to 70 pbw, and still more typically, from about 15 to 60 pbw, $ZrO_2$, and from about 2 to 78 pbw, more typically from about 5 to 75 pbw, even more typically from about 10 to 70 pbw, and still more typically, from about 15 to 60 pbw, $CeO_2$, provided that the combined amount of $ZrO_2$ and $CeO_2$ does not exceed 80 pbw.

In one embodiment, the composite oxide of the present invention comprises oxides of aluminum and cerium, or oxides of aluminum and zirconium, or oxides of aluminum, cerium, and zirconium, and, optionally, oxides of one or more dopants selected from transition metals, rare earths, and mixtures thereof, each in an amount, expressed as pbw of the discrete binary oxide of the respective element per 100 pbw of the composite oxide of:

(a) from about 20 to about 98 pbw more typically from about 20 to about 95 pbw, $Al_2O_3$, and (b)(i) from about 2 to about 80 pbw, more typically from about 5 to about 80 pbw, $ZrO_2$, or (b)(ii) from about 2 to about 80 pbw more typically from about 5 to about 80 pbw, $CeO_2$, or (b)(iii) from about 2 to less than 78 pbw more typically from about 5 to about 75 pbw, $ZrO_2$ and from 2 to 78 pbw, more typically from about 5 to about 75 pbw, $CeO_2$, provided that the combined amount of $ZrO_2$ and $CeO_2$ does not exceed 80 pbw, and (c) optionally, up to about 15 pbw of a combined amount of oxides of one or more dopants selected from transition metals, rare earths, and mixtures thereof.

The oxides of the dopant elements may each independently be present as discrete oxides of the respective dopant element, as a component in the oxides of aluminum, zirconium, cerium, and/or one or more of the other dopant elements. Suitable dopant elements include yttrium (Y), lanthanum (La), praseodymium (Pr), neodymium (Nd), samarium (Sa) europium (Eu), gadolinium (Gd), terbium (Tb), dysprosium (Dy), holmium (Ho), erbium (Er), thulium (Tm), ytterbium (Yb), lutetium (Lu), and scandium (Sc). In one embodiment, the inorganic oxide comprises oxides of one or more of Y, La, Pr, Nd, and Gd.

In one embodiment, the composite oxide of the present invention comprises oxides of aluminum and lanthanum, wherein, with the amounts of the oxides of aluminum and lanthanum in the composite oxide each expressed as an amount of the discrete binary oxide of the respective element, the amount of $La_2O_3$ is greater than or equal to 2 pbw per 100 pbw of $Al_2O_3$, and the composite oxide exhibits improved aluminum oxide phase stability.

In one embodiment, the composite oxide of the present invention comprises oxides of aluminum, zirconium, cerium and yttrium, wherein, with the amounts of the oxides of zirconium, cerium, and yttrium each expressed as an amount of the discrete binary oxide of the respective element, the amount of $Y_2O_3$ is greater than or equal to 2 pbw, per 100 pbw of the combined amount of $ZrO_2$ and $CeO_2$, and the composite oxide exhibits improved zirconium oxide-cerium oxide phase stability.

In one embodiment, the inorganic oxide of the present invention comprises oxides of Y and La, oxides of Y and Pr, oxides of Y and Nd, oxides of Y and Gd, oxides of La and Pr, oxides of La and Nd, oxides of La and Gd, oxides of Pr and Nd, oxides of Pr and Gd, or oxides of Nd and Gd.

In one embodiment, the inorganic composite oxide of the present invention comprises:
oxides of aluminum, zirconium, cerium, Y, and La,
oxides of aluminum, zirconium, cerium, Y, and Pr,
oxides of aluminum, zirconium, cerium, Y, and Nd,
oxides of aluminum, zirconium, cerium, Y, and Gd,
oxides of aluminum, zirconium, cerium, La, and Pr,
oxides of aluminum, zirconium, cerium, La, and Nd,
oxides of aluminum, zirconium, cerium, La, and Gd,
oxides of aluminum, zirconium, cerium, Pr, and Nd,
oxides of aluminum, zirconium, cerium, Pr, and Gd, or
oxides of aluminum, zirconium, cerium, Nd, and Gd.

In one embodiment, the inorganic oxide of the present invention comprises oxides of Y, La, and Pr, oxides of Y, La, and Nd, oxides of Y, La, and Gd, oxides of Y, Pr, and Nd, oxides of Y, Pr, and Gd, oxides of Y, Nd, and Gd, oxides of La, Pr, and Nd, oxides of La, Pr, and Gd, oxides of La, Nd, and Gd, or oxides of Pr, Nd, and Gd.

In one embodiment, the inorganic composite oxide of the present invention comprises:
oxides of aluminum, zirconium, cerium, Y, La, and Pr,
oxides of aluminum, zirconium, cerium, Y, La, and Nd,
oxides of aluminum, zirconium, cerium, Y, La, and Gd,
oxides of aluminum, zirconium, cerium, Y, Pr, and Nd,
oxides of aluminum, zirconium, cerium, Y, Pr, and Gd,
oxides of aluminum, zirconium, cerium, Y, Nd, and Gd
oxides of aluminum, zirconium, cerium, La, Pr, and Nd
oxides of aluminum, zirconium, cerium, La, Pr, and Gd,
oxides of aluminum, zirconium, cerium, La, Nd, and Gd, or
oxides of aluminum, zirconium, cerium, Pr, Nd, and Gd.

In one embodiment, the composite oxide of the present invention comprises oxides of aluminum, zirconium, cerium and yttrium and lanthanum and/or neodymium and/or praseodymium, wherein, with the amounts of oxides of zirconium, cerium, and the respective dopant elements each expressed as an amount of the discrete binary oxide of the respective element:

the combined amount of $La_2O_3$, $Nd_2O_3$, and/or $Pr_6O_{11}$ is greater than or equal to 2 pbw per 100 pbw of $Al_2O_3$, and the amount of $Y_2O_3$ is greater than or equal to 2 pbw per 100 pbw of the combined amount of $ZrO_2$ and $CeO_2$, and the composite oxide exhibits improved aluminum oxide phase stability and improved zirconium oxide-cerium oxide phase stability.

In one embodiment, the amount of oxides of one or more dopant elements in the inorganic composite oxide of the present invention, expressed as pbw of the combined amount of the discrete binary oxides of the respective dopant elements per 100 pbw of the composite oxide, is from greater than 0 to about 15 pbw, more typically from about 1 to 12 pbw, and even more typically, from about 2 to 10 pbw of the oxides of one or more dopant elements.

In one embodiment, the relative amounts of the component elements of the oxides of the inorganic composite oxide formula are, expressed as binary oxides of the respective elements, according to structure (I):

$$(Al_2O_3)_a(CeO_2)_b(ZrO_2)_c(M_xO_y)_d(M'_{x'}O_{y'})_e(M''_{x''}O_{y''})_f \quad (I)$$

wherein:

each of $M_xO_y$, $M'_{x'}O_{y'}$, $M''_{x''}O_{y''}$ is a binary oxide independently selected from $Y_2O_3$, $La_2O_3$, $Nd_2O_3$, $Pr_6O_{11}$, $Gd_2O_3$:

coefficients a, b, c, d, e, and f reflect the respective molar amounts of the respective binary oxides, wherein:

$35 \leq a \leq 97$,
$0 \leq b \leq 50$,
$0 \leq c \leq 60$,
$0 \leq d \leq 14$,
$0 \leq e \leq 14$, and
$0 \leq f \leq 14$, provided that:

no two of M, M', and M" are the same element, and
the sum of d+e+f is less than or equal to 14.

In one embodiment, oxides of aluminum and optionally one or more dopant elements for a first single crystallographic phase and the oxides of one or more of zirconium and cerium and optionally of one or more dopant elements form a second crystallographic phase.

In one embodiment, the inorganic oxide of the present invention comprises a porous alumina structure comprising oxides of alumina and, optionally, oxides of one or more associated dopant elements, and having a surface area, and structures, typically nanoparticles, comprising zirconium oxide, cerium oxide, or zirconium and cerium oxides, and, optionally, oxides of one or more associated dopant elements, supported on the surface of the porous alumina structure.

In one embodiment, the inorganic oxide of the present invention comprises a porous alumina structure comprising aluminum oxide and, optionally, oxides of one or more associated dopant elements, and having a surface that comprises an outer surface area and an internal surface area that is accessible through the pores of the porous alumina structure, and particulate structures, typically nanoparticles, comprising zirconium oxide, cerium oxide, or zirconium and cerium oxides and, optionally, oxides of one or more associated dopant elements, supported on the surface of the porous alumina structure, wherein the particulate structures comprising zirconium oxide, cerium oxide, or zirconium and cerium oxides and, optionally, oxides of one or more associated dopant elements, are distributed substantially evenly over the outer surface area and accessible internal surface area of the porous alumina structure.

In one embodiment, the inorganic oxide of the present invention comprises a porous alumina structure comprising aluminum oxide and, optionally, oxides of one or more associated dopant elements and having a surface that comprises an outer surface area and an internal surface area, and particulate structures, typically nanoparticles comprising zirconium oxide, cerium oxide, or zirconium and cerium oxides, and, optionally, oxides of one or more associated dopant elements, supported on the surfaces of the porous alumina structure, wherein the particulate structures comprising zirconium oxide, cerium oxide, or zirconium and cerium oxides and, optionally, oxides of one or more associated dopant elements, are distributed more densely over the outer surface area of the aluminum oxide support structure than over the internal surface area of the aluminum oxide support structure.

In one embodiment, the structures comprising oxides of one or more of zirconium and cerium are nanoparticles having, after calcination at 1200° C. for 5 hours, a particle diameter or longest characteristic dimension of from about 10 to about 50 nm, more typically, from about 15 to about 35 nm.

In one embodiment, the inorganic oxide of the present invention is in the form of powder having a average particle size of from about 1 to 200 micrometers ("μm"), more typically from 10 to 100 μm; or in the form of beads having an average particle size of from 1 millimeter ("mm") to 10 mm. Alternately, inorganic oxide can be in the form of pellets or extrudate (e.g. cylindrical shape), with the size and particular shape being determined by the particular application contemplated.

In one embodiment, the inorganic oxide of the present invention exhibits a high specific surface area having good thermal stability.

In one embodiment, the inorganic composite oxide of the present invention exhibits a BET specific surface area after calcining at 900° C. for 2 hours of greater than or equal to that calculated according to Equation (1):

$$SA = 1.8095[Al] + 31.286 \qquad (Eq. 1)$$

wherein:

SA is the BET specific surface area of the inorganic composite oxide, in square meters per gram (m²/g), and
[Al] is the amount of oxides of aluminum in the composite oxide, expressed as pbw $Al_2O_3$ per 100 pbw of the composite oxide.

In one embodiment, the inorganic composite oxide of the present invention exhibits a BET specific surface area after calcining at 1100° C. for 5 hours of greater than or equal to that calculated according to Equation (2):

$$SA = 0.8235[Al] + 11.157 \qquad (Eq. 2)$$

wherein SA and [Al] are each as defined above in regard to Equation 1.

In one embodiment, the inorganic composite oxide of the present invention exhibits a BET specific surface area after calcining at 1200° C. for 5 hours of greater than or equal to that calculated according to Equation (3.1):

$$SA = 0.3[Al] + 7 \qquad (Eq. 3.1)$$

wherein SA and [Al] are each as defined above in regard to Equation 1.

In one embodiment, the inorganic composite oxide of the present invention exhibits a BET specific surface area after calcining at 1200° C. for 5 hours of greater than or equal to that calculated according to Equation (3.1), and, for $50 < [Al] \leq 90$, greater than or equal to that calculated according to Equation (3.2):

$$SA = 0.72[Al] - 14 \qquad (Eq. 3.2),$$

wherein SA and [Al] are, in each case, each as defined above in regard to Equation 1.

In one embodiment, the inorganic composite oxide of the present invention exhibits a BET specific surface area after calcining at 900° C. for 2 hours of greater than or equal to that calculated according to Equation (1) and a BET specific surface area after calcining at 1100° C. for 5 hours of greater than or equal to that calculated according to Equation (2). In one embodiment, the inorganic composite oxide of the present invention exhibits a BET specific surface area after calcining at 900° C. for 2 hours of greater than or equal to that calculated according to Equation (1), a BET specific surface area after calcining at 1100° C. for 5 hours of greater than or equal to that calculated according to Equation (2), and a BET specific surface area after calcining at 1200° C. for 5 hours of greater than or equal to that calculated according to Equation (3.1) or Equation (3.1) and Equation (3.2). In one embodiment, the inorganic composite oxide of the present invention exhibits a BET specific surface area after calcining at 900° C. for 2 hours of greater than or equal to that calculated according to Equation (1), a BET specific surface area after calcining at 1100° C. for 5 hours of greater than or equal to that calculated according to Equation (2), and a BET specific surface area after calcining at 1200° C. for 5 hours of: for 20≤[Al]≤50, greater than or equal to that calculated according to Equation (3.1) and, for 50<[Al]≤90, greater than or equal to that calculated according to Equation (3.2).

In one embodiment, the inorganic composite oxide of the present invention exhibits a pore volume having good thermal stability.

In one embodiment, the inorganic composite oxide of the present invention exhibits a pore volume after calcining at 900° C. for 2 hours of greater than or equal to that calculated according to Equation (4.1):

$$PV=0.0097[Al]+0.0647 \quad \text{(Eq. 4.1)}$$

wherein:
PV is the total pore volume of the inorganic composite oxide, in cubic centimeters per gram (cm³/g), and
[Al] is as defined above in regard to Equation 1.

In a preferred embodiment, wherein the inorganic composite oxide is made by sequential method, as described more fully below, of precipitating aluminum hydrates under acidic reaction conditions and then precipitating hydrates of zirconium and/or cerium, the inorganic composite oxide of the present invention exhibits pore volume after calcining at 900° C. for 2 hours of greater than or equal to that calculated according to Equation (4.2):

$$PV=0.0107[Al]+0.25 \quad \text{(Eq. 4.2)}$$

wherein PV and [Al] are each as defined above in regard to Equation 4.1.

As Equation 4.2 gives a higher PV for any given [Al], the pore volume of such inorganic composite oxides after calcining at 900° C. for 2 hours will also necessarily be greater than or equal to that calculated according to Equation (4.1)

The inorganic oxide of the present invention exhibits a mixing of cerium, zirconium and any optional dopant elements homogeneous at molecular level, characterized by the fact that the oxides of cerium and zirconium form a solid solution, rather than a mixture of the binary oxides cerium oxide and zirconium oxide. Homogeneous mixing of cerium and zirconium is evidenced by X-Ray diffraction analysis technique with the existence, in addition to alumina related crystalline phases, of one single crystalline phase related to fluorite type crystalline structure, by contradiction with the existence of several crystalline phases corresponding to the different binary oxides cerium oxide, zirconium oxide or eventually dopant oxides.

The inorganic oxide of the present invention exhibits improved phase stability. In one embodiment, the inorganic composite oxide exhibits a crystalline structure prior to calcination and retains substantially the same crystalline structure after calcining at 900° C. for 2 hours. In particular, after calcination, X-Ray diffraction analysis technique does not evidence significant amount of alpha alumina or phase partitioning for the cerium oxide—zirconium oxide crystalline phase. In one embodiment, the inorganic composite oxide exhibits a crystalline structure prior to calcination and retains substantially the same crystalline structure after calcining at 900° C. for 2 hours and after calcining at 1100° C. for 5 hours. In one embodiment, the inorganic composite oxide exhibits a crystalline structure prior to calcination and retains substantially the same crystalline structure after calcining at 900° C. for 2 hours and after calcining at 1100° C. for 5 hours. In one embodiment, the inorganic composite oxide exhibits a crystalline structure prior to calcination and retains substantially the same crystalline structure after calcining at 900° C. for 2 hours, after calcining at 1100° C. for 5 hours, and after calcining at 1200° C. for 5 hours.

The porous inorganic composite oxide of the present invention is made by reaction of aluminum precursor materials, zirconium, and/or cerium precursor materials and optional dopant precursor materials in an aqueous medium. As referred to herein, an aqueous medium is a medium comprising water and which may optionally further comprise one or more water soluble organic liquids such as for example, lower alkanols, such as methanol, ethanol, propanol and butanol, lower glycols, such as ethylene glycol and propylene glycol, and lower ketones, such as acetone and methyl ethyl ketone.

In one embodiment:
(i) particles comprising aluminum hydrate, and
(ii) particles comprising zirconium hydrate, or particles comprising cerium hydrate, or particles comprising zirconium hydrate and cerium hydrate, are formed sequentially by:
(1.1) forming particles of aluminum hydrate in the aqueous medium at a temperature of greater than 50° C.,
(1.2) after step (a)(1.1), adjusting the pH of the aluminum hydride particle-containing aqueous medium to a pH of from 4 to 6, and
(1.3) after step (a)(1.2), forming the particles comprising zirconium hydrate, particles comprising cerium hydrate, or particles comprising zirconium hydrate and cerium hydrate in the aluminum hydride particle-containing aqueous medium, typically at a temperature of greater than 50° C.

Hydrated aluminum oxide, such as, for example, $Al(OH)_3$, boehmite, gibbsite, or bayerite, or a mixture thereof, is formed in an aqueous medium. The hydrated aluminum oxide can be formed in the aqueous medium from water soluble aluminum salts by a variety of known methods, such as, for example, by adding ammonium hydroxide to an aqueous solution of an aluminum halide, such as aluminum chloride, or by reacting aluminum sulfate with an alkali metal aluminate, such as sodium aluminate, in the aqueous medium. Suitable water soluble aluminum salts comprise an aluminum cation, such as $Al^{3+}$, and a negatively charged counterion or an aluminum-containing anion, such as $Al(OH)_4^-$, and a positively charged counterion. In one embodiment, the water soluble water aluminum salts comprise one or more water soluble aluminum salts that each independently comprise an aluminum cation and a negatively charged counterion, such as, for example aluminum halide salts or aluminum sulfate salts. In another embodiment, the water soluble aluminum salts comprise one or more water soluble aluminum salts that each independently comprise an aluminum anion and a positively charged counterion, such as for example, water soluble alkali metal aluminate salts. In another embodiment, the water soluble aluminum salts comprise one or more water soluble aluminum salts that each independently comprise an aluminum cation and a negatively charged counterion, and one or more water soluble aluminum salts that each independently comprise an aluminum anion and a positively charged counterion.

In one embodiment, a water soluble aluminum precursor is introduced into the reactor in the form of an aqueous solution of the water soluble aluminum precursor. The acidity of such aluminum precursor solution can optionally be adjusted over a wide range, through addition of acid or base. For example, an acid, such as nitric acid, chloridric acid, sulfuric acid, or a mixture thereof, may be added to increase the acidity of an aluminum sulfate or aluminum chloride solution or a base, such as sodium hydroxide, potassium hydroxide or a mixture thereof, may be added to decrease the acidity of a sodium aluminate solution. In one embodiment, the acidity of the aluminum precursor solution is adjusted prior to introduction of the precursor solution into the reactor by adding acid to the aluminum precursor solution. In one embodiment, the acidity of the aluminum precursor solution is adjusted prior to introduction of the precursor solution into the reactor by adding base to the aluminum precursor solution In one embodiment, aluminum hydrate seeds are first formed at an acidic pH in a very dilute aqueous system and more aluminum hydrate is then deposited on the seed crystals at a pH of from about 3 to about 6.

In one embodiment, aluminum hydrate seeds are formed by reacting aluminum sulfate and sodium aluminate in an aqueous medium at a pH of from about 2 to about 5 in a reaction vessel and more aluminum hydrate is deposited on the seeds by simultaneously feeding aqueous streams of aluminum sulfate and sodium aluminate into the reaction vessel while allowing the pH of the aqueous medium to gradually increase to a pH of from about 3 to about 6, more typically from about 5 to about 6. The temperature of the aqueous medium during formation of hydrated aluminum oxide is typically in the range of from about 30° C. to about 100° C., more typically from about 50° C. to about 100° C., even more typically from about 55° C. to 100° C., and still more typically from 60° C. to less than 100° C.

In one embodiment, aluminum hydrate seeds are formed by reacting aluminum sulfate and sodium aluminate in an aqueous medium at a pH of from about 2 to about 5 in a reaction vessel and more aluminum hydrate is deposited on the seeds by simultaneously feeding aqueous streams of aluminum sulfate and sodium aluminate into the reaction vessel while allowing the pH of the aqueous medium to gradually increase to a pH of from about 3 to about 6, more typically from about 4 to about 5. The temperature of the aqueous medium during formation of hydrated aluminum oxide is typically in the range of from about 30° C. to about 100° C., more typically from about 50° C. to about 100° C., even more typically from about 55° C. to 100° C., and still more typically from 60° C. to less than 100° C. It has been found that the particles of aluminum hydrate or silica precursor-contacted particles of aluminum hydrate of the alternative embodiment tend to exhibit, after calcining, particularly high specific pore volume wherein the pore volume fraction contributed by small diameter pores is particularly low.

In one embodiment, aluminum hydrate seeds forming is omitted and aluminum hydrate is directly formed by simultaneously feeding aqueous streams of aluminum sulfate and sodium aluminate into the reaction vessel while allowing the pH of the aqueous medium to gradually increase to a pH of from about 3 to about 6, more typically from about 4 to about 5. The temperature of the aqueous medium during formation of hydrated aluminum oxide is typically in the range of from about 30° C. to about 100° C., more typically from about 50° C. to about 100° C., even more typically from about 55° C. to 100° C., and still more typically from 60° C. to less than 100° C. It has been found that the particles of aluminum hydrate or silica precursor-contacted particles of aluminum hydrate of the alternative embodiment tend to exhibit, after calcining, high specific pore volume wherein the pore volume fraction contributed by small diameter pores is low.

In one embodiment, precipitation of particles of aluminum hydrate from the aqueous medium is continued, typically by allowing the pH of the aqueous medium to increase to about 8 to 10, more typically from about 8.5 to about 9.5, to form a slurry of aluminum hydrate particles suspended in the aqueous medium. In one embodiment, wherein an aluminum hydrate is formed by simultaneously feeding streams of aqueous aluminum sulfate and aqueous sodium aluminate to the reaction vessel, the particles of aluminum hydrate may be precipitated by discontinuing the feed of the aluminum sulfate stream, while continuing the feed of the sodium aluminate stream and allowing the pH of the reaction medium to increase with the continued addition of sodium aluminate to the reaction vessel. Sodium hydroxide or any alkali solution could be used also to increase the pH of the solution. The amount of aluminum hydrate particles formed is typically in the range of from about 3 to about 50 parts by weight ("pbw") of hydrated aluminum oxide particles per 100 pbw of the slurry. The temperature of the aqueous medium during precipitation of aluminum hydrate particles is typically in the range of from about 30° C. to about 100° C., more typically from about 50° C. to about 100° C., even more typically from about 55° C. to 100° C., and still more typically from 60° C. to less than 100° C. The aqueous medium in which the aluminum hydrate is formed contains the counterions of the water soluble aluminum salts from which the aluminum hydrate is made.

After precipitation of aluminum hydrate particles, the pH of the aqueous slurry of aluminum hydrate particles is adjusted to a pH of from 4 to 6 and particles comprising zirconium hydrate, particles comprising cerium hydrate, or particles comprising zirconium hydrate and cerium hydrate are then formed in the aluminum hydride particle-containing aqueous medium.

In one embodiment, a water soluble zirconium precursor and/or cerium precursor material is introduced into the reactor in the form of an aqueous solution of the precursor material. Suitable water soluble zirconium precursors include, for example, zirconium nitrate, zirconium oxychloride, zirconium sulfate, zirconium orthosulfate, zirconium acetate, zirconium lactate, and zirconium ammonium carbonate, as well as mixtures thereof, such as mixtures of zirconium nitrate and zirconium sulfate. Suitable water soluble cerium precursors include, for example, cerous nitrate, ceric nitrate, cerous sulfate, ceric sulfate, and ceric ammonium nitrate, as well as mixtures thereof, such as mixtures of cerous nitrate and ceric nitrate. The acidity of such precursor solution can optionally be adjusted over a wide range, through addition of acid or base. For example, an acid, such as nitric acid, chloridric acid, sulfuric acid, or a mixture thereof, may be added to increase the acidity of the precursor solution or a base, such as sodium hydroxide, potassium hydroxide or a mixture thereof, may be added to decrease the acidity of a precursor solution. In one embodiment, the acidity of the precursor solution is adjusted prior to introduction of the precursor solution into the reactor by adding acid to the precursor solution. In one embodiment, the acidity of the precursor solution is adjusted prior to introduction of the precursor solution into the reactor by adding base to the precursor solution. Alternatively, the zirconium and or cerium precursor materials may be introduced as a colloidal dispersion of a zirconium-containing or cerium containing material such as a zirconium salt or a cerium salt, in an organic liquid, typically a water soluble organic liquid, such as those described above as suitable components of the aqueous medium, In one embodiment, when cerous nitrate is used as a cerium precursor, it is preferable to have hydrogen peroxide present in the aqueous medium during the precipitation of cerium hydrate or cerium-zirconium hydrate particles. Hydrogen peroxide can be mixed for example with the cerium precursor solution prior to the addition of cerium precursor solution in the reactor. The molar ratio of moles of hydrogen peroxide over the moles of cerium is typically from about 1 to 6, more typically from about 3 to 6.

In one embodiment, particles of aluminum hydrate are formed in the aqueous medium, and the particles of zirconium hydrate are then formed by introducing soluble zirconium precursor to the aqueous medium subsequent to formation of the particles of aluminum hydrate. In one embodiment, particles of aluminum hydrate are formed in the aqueous medium, and the particles of cerium hydrate are then formed by introducing cerium precursor material to the aqueous medium subsequent to formation of the particles of aluminum hydrate. In one embodiment, particles of aluminum hydrate are formed in the aqueous medium, and the particles of zirconium hydrate and cerium hydrate are then formed by introducing zirconium precursor and cerium precursor to the aqueous medium subsequent to formation of the particles of aluminum hydrate.

The zirconium and or cerium precursor materials are typically added to the aluminum hydrate-containing aqueous medium at a temperature of greater than 50° C., more typically from greater than 50° C. to about 100° C., and even more typically from about 55° C. to 100° C., and still more typically from 60° C. to less than 100° C., while maintaining the pH of the aqueous medium in the range of 4 to 6. Following addition of all of the zirconium and or cerium precursor materials, the pH is adjusted to a pH of greater than 7, more typically a pH of from 8 to 9, to precipitate particles comprising zirconium hydrate, particles comprising cerium hydrate, or particles comprising zirconium hydrate and cerium hydrate in the aluminum hydrate-containing liquid medium.

In another embodiment:
(i) particles comprising aluminum hydrate, and
(ii) particles comprising zirconium hydrate, or particles comprising cerium hydrate, or particles comprising zirconium hydrate and cerium hydrate, are formed simultaneously by forming the particles comprising aluminum hydrate and particles comprising zirconium hydrate, or particles comprising cerium hydrate, or particles comprising zirconium hydrate and cerium hydrate in an aqueous medium at a temperature of greater than 50° C.

In one embodiment, particles of aluminum hydrate and particles of zirconium hydrate are formed simultaneously by introducing aluminum precursor and zirconium precursor into the reactor prior to formation of particles of aluminum hydrate. In one embodiment, particles of aluminum hydrate particles of cerium hydrate are formed simultaneously by introducing aluminum precursor and cerium precursor into the reactor prior to formation of particles of aluminum hydrate. In one embodiment, the particles of aluminum hydrate, particles of zirconium and particles of cerium hydrate are formed simultaneously by introducing aluminum precursor, zirconium precursor and cerium precursor into the reactor prior to formation of particles of aluminum hydrate.

In one embodiment, the aluminum precursor materials, zirconium precursor and/or cerium precursor materials are introduced into the reactor and particles of aluminum hydrate, zirconium hydrate and/or cerium hydrate are formed under the conditions disclosed above in the sequential embodiment of the method of the present invention as being suitable for formation of aluminum hydrate particles In one embodiment, the aluminum precursor materials, zirconium precursor and/or cerium precursor materials are introduced into the reactor at a temperature of greater than or equal to 50° C., more typically at a temperature of from 55 to 100° C., even more typically of from 60 to less than 100° C. In one embodiment, the pH of the aqueous medium to is allowed to increase to about 8 to 10, more typically from about 8.5 to about 9.5 during the addition of the aluminum precursor material, zirconium precursor material, and/or cerium precursor material into the reactor, and as the pH increases, the (i) particles comprising aluminum hydrate and (ii) particles comprising zirconium hydrate, or particles comprising cerium hydrate, or particles comprising zirconium hydrate and cerium hydrate are formed. In another embodiment, the pH of the aqueous medium to maintained in a range of from about 4 to about 6 during the addition of the aluminum precursor material, zirconium precursor material, and/or cerium precursor material into the reactor, and then increased to a pH of greater than 8 to allow formation of the (i) particles comprising aluminum hydrate and (ii) particles comprising zirconium hydrate, or particles comprising cerium hydrate, or particles comprising zirconium hydrate and cerium hydrate.

In each case, the contacting of the aluminum hydrate with the zirconium precursor and/or cerium precursor materials is typically conducted in the aqueous medium and in the presence of the counterions of the one or more water soluble aluminum salts. In one embodiment, one or more species of negatively charged counterions, such as halide anions or sulfate anions, are present in the aqueous medium. In one embodiment, one or more species of positively charged counterions, such as alkali metal cations, are present in the aqueous medium. In one embodiment, one or more species of negatively charged counterions and one or more species of positively charged counterions are each present in the aqueous medium.

A given dopant element is typically introduced to the porous inorganic composite oxide of the present invention by adding a dopant element precursor, typically a water soluble salt of the desired dopant element, to the reaction vessel during the above described formation of the hydrated aluminum oxide and/or during addition of the zirconium precursor and/or cerium precursor materials. Suitable dopant element precursors include water soluble salts of the relevant dopant element, such as, for example, yttrium nitrate, yttrium chloride, yttrium acetate, lanthanum nitrate, lanthanum chloride, lanthanum acetate, praseodymium nitrate, praseodymium chloride, praseodymium acetate, neodymium nitrate, neodymium chloride, neodymiun acetate, gadolinium nitrate, gadolinium chloride, gadolinium acetate, and mixtures thereof.

The zirconium, cerium and/or dopant elements may also be introduced as a colloidal dispersion of the element in a solvent, wherein the solvent might contain additional ions for dispersion stabilization. To ensure good stability of the colloidal suspension and to obtain high dispersion of the element within the porous inorganic composite oxide, the size of the colloids is preferably between 1 and 100 nm. The zirconium, cerium and/or dopant elements may be introduced to the reaction mixture simultaneously as the element in the form of colloidal particles of the element and as an aqueous solution of ionic species of the element.

The zirconium oxide and/or cerium precursor and optional dopant precursor materials may be introduced in a batch mode or in a continuous mode. In one embodiment of a batch mode process, the precursor materials are introduced to a reaction vessel containing the aluminum hydrate and aqueous medium while the contents of the reaction vessel are mixed. In another embodiment of a batch mode process, the precursor materials are introduced to the reaction vessel simultaneously with the charge of water soluble aluminum salts and the contents of the reaction vessel are mixed. In one embodiment of a continuous process, streams of an aqueous suspension of aluminum hydrate, and aqueous solutions of zirconium precursor, cerium precursor and dopant precursor materials are simultaneously fed to an in-line mixing device.

In one embodiment, an dopant element is introduced by adding a dopant element precursor, typically in the form of an aqueous solution of the dopant element precursor, either as a separate feed stream or by mixing the dopant element precursor solution with one of the feeds containing the aluminum precursor materials, to the reaction vessel during formation of the hydrated aluminum hydrate particles.

In another embodiment, a dopant element is introduced by adding an dopant element precursor, typically in the form of an aqueous solution of the dopant element precursor, to the reaction vessel after formation of the hydrated aluminum oxide particles, either as a separate feed stream or by mixing the dopant element precursor solution with one of the feed streams containing the zirconium precursor material or cerium precursor material. In this case, it the pH of the aqueous slurry of hydrated aluminum oxide particles is typically adjusted to a pH of from about 4 to about 9 with acid, such as nitric acid, sulfuric acid, or acetic acid, prior to the addition of the dopant element precursor solution. The dopant element precursor solution is then added to the reaction vessel under continuous agitation. After this addition is complete, the pH is generally adjusted to a pH of from about 6 to about 10 by addition of a base, such as, ammonium hydroxide or sodium hydroxide.

In one embodiment, the mixture of aluminum hydrate particles, zirconium oxide and/or cerium precursor materials and optional dopant precursor materials is heated to a temperature above ambient temperature, more typically to a temperature of from about 50° C. to about 200° C. for a time period of from about 20 minutes to about 6 hours, more typically from about 20 minutes to about 1 hour. For temperatures greater than 100° C., the heating is conducted in a pressure vessel at a pressure of greater than atmospheric pressure.

The precipitated particles comprising aluminum, zirconium, cerium, and/or dopant element hydrates are then isolated from the aqueous medium, typically by filtration. In one embodiment, prior to isolation of the particles from the aqueous medium, the pH of the suspension of metal precursor-contacted aluminum hydrate particles in the aqueous medium is adjusted to a pH of from about 4 to about 10, by the introduction of acid, typically an acid comprising nitric acid, sulfuric acid, or acetic acid, to the suspension.

In one embodiment, the particles of zirconium oxide and/or cerium precursor material-contacted aluminum hydrate are washed to remove residues. In one embodiment, prior to isolation of the particles from the aqueous medium, one or more water soluble salts are added to the suspension of particles in the aqueous medium in order to improve washing efficiency. Suitable water soluble salts include, for example, ammonium nitrate, ammonium sulfate, ammonium hydroxide, ammonium carbonate, potassium carbonate, sodium carbonate, aluminum bicarbonate, and mixtures thereof.

The washing may be conducted using hot water and/or an aqueous solution of a water-soluble ammonium salt such as, for example, ammonium nitrate, ammonium sulfate, ammonium hydroxide, ammonium carbonate, potassium carbonate, sodium carbonate, ammonium bicarbonate, and the like or mixtures thereof. In one embodiment of the washing step, the slurry of aluminum hydrate particles or metal oxide-clad aluminum hydrate particles is dewatered, then washed with an aqueous solution of water-soluble ammonium salt, then dewatered, then washed with water, and then dewatered again to form a wet cake of washed particles.

In one embodiment, the wet cake of washed particles of zirconium oxide and/or cerium precursor material-contacted aluminum hydrate is re-dispersed in water to form a second aqueous slurry.

In one embodiment, the second aqueous slurry is then spray dried to particles of aluminum hydrate or metal precursor-contacted aluminum hydrate. In another embodiment, the pH of the second aqueous slurry is adjusted to a pH of from about 4 to about 10, more typically of from about 6 to about 8.5, by the introduction of acid, such as the acids mentioned above in regard to adjustment of the pH of the suspension of particles of zirconium oxide and/or cerium precursor material-contacted aluminum hydrate in the aqueous medium, or of base, such as sodium hydroxide, to the second aqueous slurry. In one embodiment, the pH adjusted second slurry is then heated to a temperature above ambient temperature, more typically to a temperature of from about 50° C. to about 200° C., even more typically to a temperature of from about 80° C. to about 200° C. for a time period of from about 20 minutes to about 6 hours, more typically from about 20 minutes to about 1 hour. For temperatures greater than 100° C., the heating is conducted in a pressure vessel at a pressure of greater than atmospheric pressure. The particles of zirconium oxide and/or cerium precursor material-contacted aluminum hydrate of the pH adjusted second slurry are then isolated from the aqueous medium of the second slurry. In one embodiment, the particles of zirconium oxide and/or cerium precursor material-contacted aluminum hydrate isolated from the second slurry are redispersed in water to form a third aqueous slurry and the third aqueous slurry is spray dried.

The isolated or the isolated, redispersed, and spray dried particles of zirconium oxide and/or cerium precursor material-contacted aluminum hydrate are then calcined to form the desired alumina or metal oxide-clad alumina product. In one embodiment, the particles of zirconium oxide and/or cerium precursor material-contacted aluminum hydrate are calcined at elevated temperature, typically from 400° to 1100° C., for greater than or equal to about 30 minutes, more typically from about 1 to about 5 hours, to form the porous inorganic composite oxide product. The calcination can be conducted in air, or nitrogen, optionally in the presence of up to about 20% water vapor.

In one embodiment, the particles of inorganic oxide are calcined at greater than or equal to 400° C., more typically from about 600 to about 1100° C. for greater than or equal to 1 hour, more typically from about 2 to about 4 hours.

The porous inorganic composite oxide of the present invention, especially when in the form of a powder of from 1 to 200 μm, more typically from 10 to 100 μm, can be further used as a catalytic coating on a low surface area substrate. The substrate structure can be chosen from a variety of forms for a particular application. Such structural forms include monoliths, honeycomb, wire mesh and the like. The substrate structure is normally formed of a refractory material such as, for example, alumina, silica-alumina, silica-magnesia-alumina, zirconia, mullite, cordierite, as well as wire mesh and the like. Metallic honeycomb substrates can also be used. The powder is slurried in water, peptized by the addition of a small amount of acid (typically mineral acids), and then subjected to milling to cause a reduction in particle size suitable for washcoating application. The substrate structure is contacted with the milled slurry, such as by dipping the substrate into the slurry. The excess material is removed, such as by application of blown air, followed by calcining the coated substrate structure to cause adhesion of the (wash-coat) silica clad high surface area alumina particulates of the present invention to adhere to the substrate structure.

Noble metals, usually the metals of the platinum group, such as platinum, palladium, rhodium and mixtures thereof, can be applied in manners well known to those skilled in this art either before wash-coating the silica clad alumina particulate using a suitable conventional noble metal precursor (acidic or basic), or after washcoating by dipping the washcoated substrate in a suitable noble-metal precursor solution (either acidic or basic). More typically the porous inorganic composite oxide is formed, followed by application of the noble metal thereto, and finally, wash-coating the porous inorganic composite oxide supported catalyst material onto a substrate.

The porous inorganic composite oxide of the present invention may be mixed with other oxide supports like alumina, magnesia, ceria, ceria-zirconia, rare-earth oxide-zirconia mixtures etc, and then wash-coating these products onto a substrate. The resultant catalyst can be directly loaded into canisters and the like either alone or in combination with other materials as part of the exhaust emission system of an internal combustion engine. Thus, the exhaust products, which normally comprise oxygen, carbon monoxide, carbon dioxide, hydrocarbons, nitrogen oxides, sulfur, sulfurous compounds and sulfur oxides, are passed through the exhaust system to provide contact with the noble-metal supported catalyst. The result provides conversion of the noxious and harmful exhaust products into more environmentally acceptable materials. When using a catalyst formed with a support of the present invention, one achieves a catalyst system having extended active term and of higher overall activity than would be achieved with catalysts having supports either with no silica or with silica-alumina formed from conventional co-precipitation or impregnation techniques.

The following examples are given as specific illustration of the claimed invention. It should be understood, however, that the invention is not limited to the specific details set forth in the examples. All parts and percentages in the examples and in the remainder of the specification are by weight unless otherwise specified.

Further, any range of numbers recited in the specification or claims, such as representing a particular set of properties, units of measure, conditions, physical states or percentages, is intended to literally incorporate expressly herein by reference or otherwise, any number falling within such range, including any subset of numbers within any range so recited.

Examples 1-23 and Comparative Example C1

Unless otherwise specified, the composition of each of the composite oxides of Examples 1-23 and Comparative Example C1 is given as relative amounts of oxides of aluminum, zirconium, cerium, and any optional dopant elements in the composite oxide, based on the combined amount of oxides of aluminum, zirconium, cerium, and any optional dopant elements in the composite oxide, each expressed as an amount of the discrete binary oxide of the respective element. Unless otherwise specified, the calcinations referred to in the various Examples were conducted in air.

Analytical results for each of the compositions of Examples 1-23 and Comparative Example C 1 are reported in TABLE I below, as surface area (SA (m$^2$/g)), pore volume (PV (cm$^3$/g)), average pore diameter (APD (nm)), surface area after calcination at 1100° C. for 5 hr, (SA 1100/5 h (m$^2$/g)), surface area after calcination at 1200° C. for 5 hr (SA 1200/5 h (m$^2$/g)), and cerium-zirconium mixed oxide crystallite size after calcination at 1200° C. for 5 hr (Fcryst 1200/5 h (nm)). Unless otherwise specified, pore size distributions, pore volume, pore diameter and BET specific surface areas are given by mean of Nitrogen adsorption technique using a Micromeretics Tristar 3000 apparatus. Pore size distribution and pore volume data were collected using 91 measurement points between P/P0=0.01 and P/P0=0.998. Specific Surface Areas (SA) are reported in square meters per gram (m$^2$/g), Pore Volumes are reported in cubic centimeters per gram (cm$^3$/g), Average Pore diameter are reported in nanometers (nm), calcination temperatures are reported in degrees Centigrade (° C.) and times are reported in hours (hr). Where provided, mercury pore size distribution data was collected on a Micromeretics Autopore Apparatus with 103 measurement points between 0.5 psia and 30 000 psia. Analysis by Transmission Electron Microscopy were conducted on ultrathin slices of material (20 to 100 nm in thickness).

Example 1

The composite oxide of Example 1 contained, based on 100 pbw of the composite oxide, 33 pbw Al$_2$O$_3$, 36 pbw CeO$_2$, 27 pbw ZrO$_2$, 1.8 pbw La$_2$O$_3$, 2 pbw Y$_2$O$_3$ and 0.2 pbw Pr$_6$O$_{11}$, and was made using the following precursors aqueous solutions: aluminum sulfate (concentration 8.3 wt % as Al$_2$O$_3$), cerium nitrate (26.9 wt % as CeO$_2$), zirconium orthosulfate (17.2 wt % as ZrO$_2$), yttrium nitrate (13.9 wt % as Y$_2$O$_3$), and a solution containing a mixture of lanthanum nitrate and praseodymium nitrate (total oxide content 27 wt % as La$_2$O$_3$ and Pr$_6$O$_{11}$, with a ratio La$_2$O$_3$/Pr$_6$O$_{11}$ of 90/10 by weight).

An acidic solution (Solution A) was made by mixing together all precursors solutions in proportions with respect to the final composition and a total oxide basis of 50 grams for the final material. The temperature in the reactor was maintained at 65° C. from the beginning of precipitation to the filtration. Some deionized water was added to a heated 1 liter reactor equipped with an agitation mobile. Solution A was introduced under agitation in the reactor in 60 minutes. During introduction of solution A, pH was regulated at a value of 9 by the introduction in the reactor of a solution of sodium hydroxide (concentration 25 wt % as NaOH). After the addition of all solution A, the flow of sodium hydroxide solution was maintained so the pH reached a value of 9.6 in 10 minutes. The reactor content was then filtered and washed with deionized water at 60° C. in a Buchner funnel to form a wet filter cake. The volume of wash water was equivalent to the volume of aqueous medium in the reactor. A solution is prepared dissolving 120 g of ammonium bicarbonate per liter of water and heated to 60° C. The wet filter cake was washed with a volume of the ammonium bicarbonate solution corresponding to twice the volume of aqueous medium in the reactor and then washed with the same volume of deionized water at 60° C. The resulting wet filter cake was then dispersed in deionized water to obtain a slurry containing about 10 wt % of solids. The slurry was then spray dried to obtain a dried powder. The spray dried powder was then calcined at 900° C. for 2 hours.

After calcination at 900° C. for 2 hours, the composite oxide of Example 1 was then calcined at higher temperature.

Figure 2:
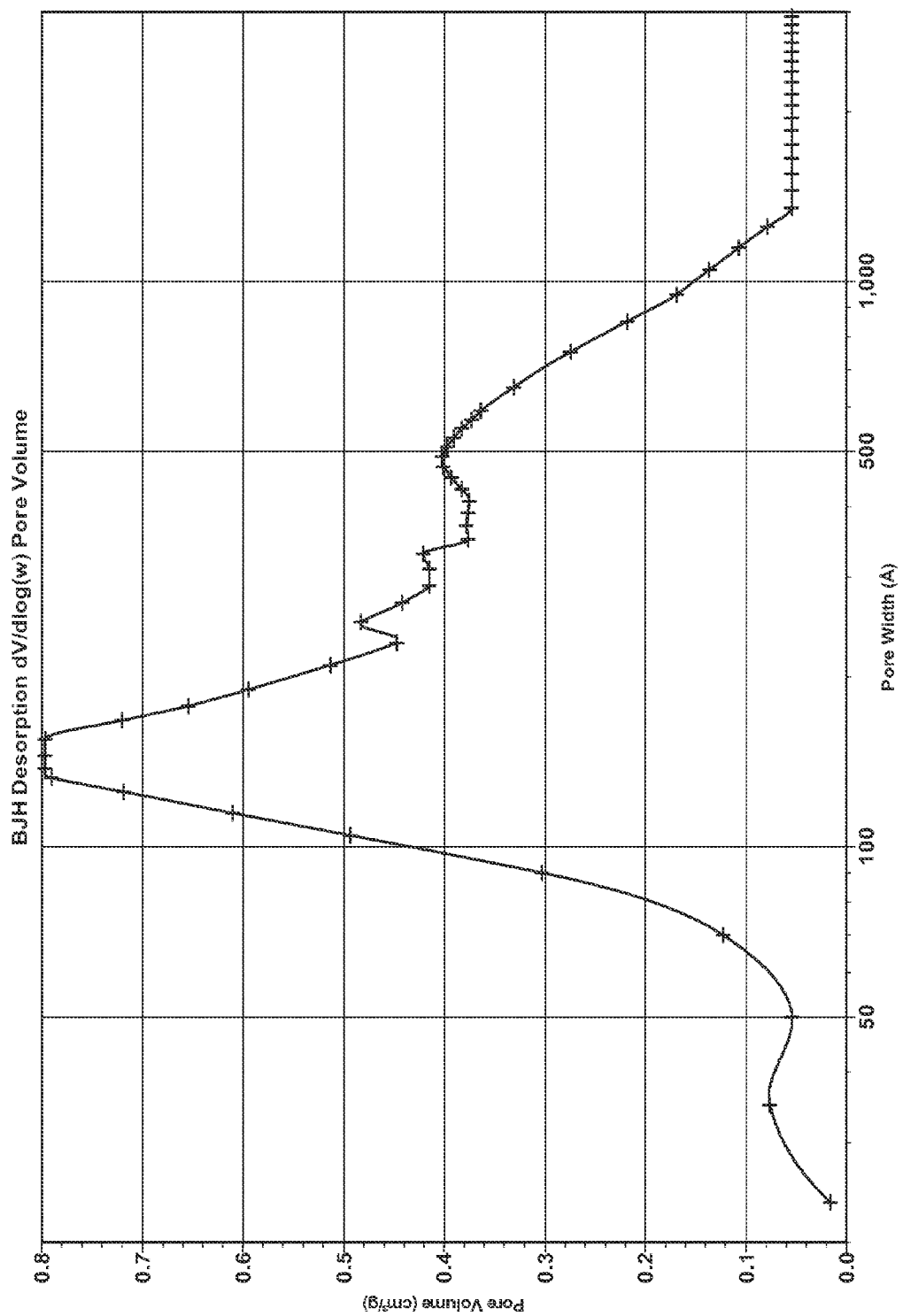
FIG. 2 shows a derivative logarithmic plot of pore size distribution for the composition of Example 1 after calcination at 900° C. for 2 hours. In each case, the derivative logarithmic plots of pore size distribution provided herein show a plot of dV/d(log w), where "V" is pore volume in centimeters per gram (cm³/g) and "w" is the pore width (in Angstroms (Å)).

FIG. 1. shows an X-Ray diffractogram of powder corresponding to the composition of Example 1 after calcination at 1200° C. for 10 hours. Only two crystalline phases are visible, corresponding to Theta alumina and a cubic phase typical of a solid solution between cerium and zirconium. No evidence was found for the binary oxides corresponding respectively to lanthanum, yttrium, or praseodymium. This shows that these dopants are incorporated in the crystalline matrix, forming a solid solution with the main components. A derivative log plot of pore size distribution of the composition of Example 1 after calcination at 900° C. for 2 hours is shown in FIG. 2.

Comparative Example 1

The composite oxide of Comparative Example 1 contained, based on 100 pbw of the composite oxide, 33 pbw $Al_2O_3$, 36 pbw $CeO_2$, 27 pbw $ZrO_2$, 1.8 pbw $La_2O_3$, 2 pbw $Y_2O_3$ and 0.2 pbw $Pr_6O_{11}$, and was made according to the method described in Example 1, except that temperature was set at 45° C.

Figure 3:
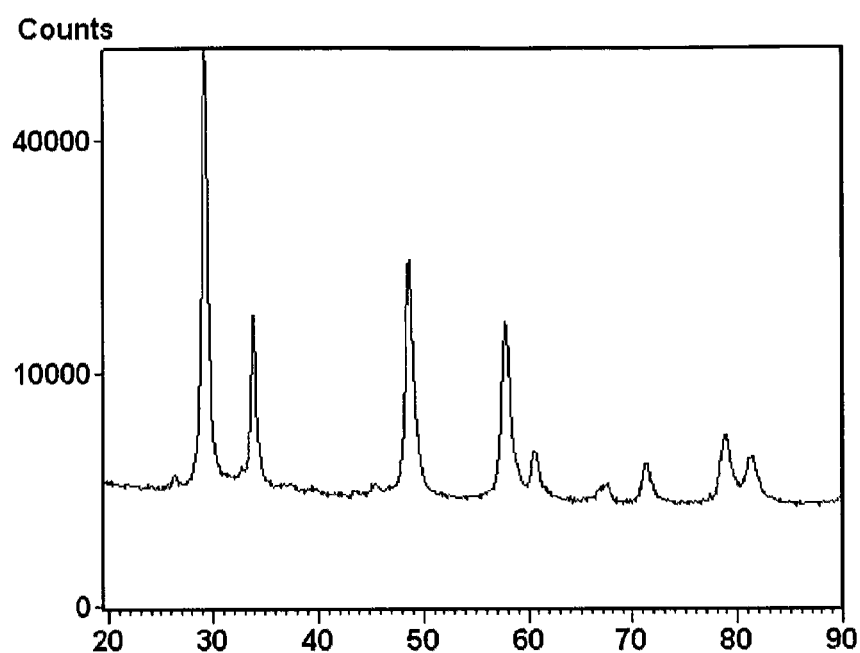
FIG. 3 shows an X-Ray diffractogram of the composition of Comparative Example 1 after calcination at 1200° C. for 5 hours.
Figure 4:
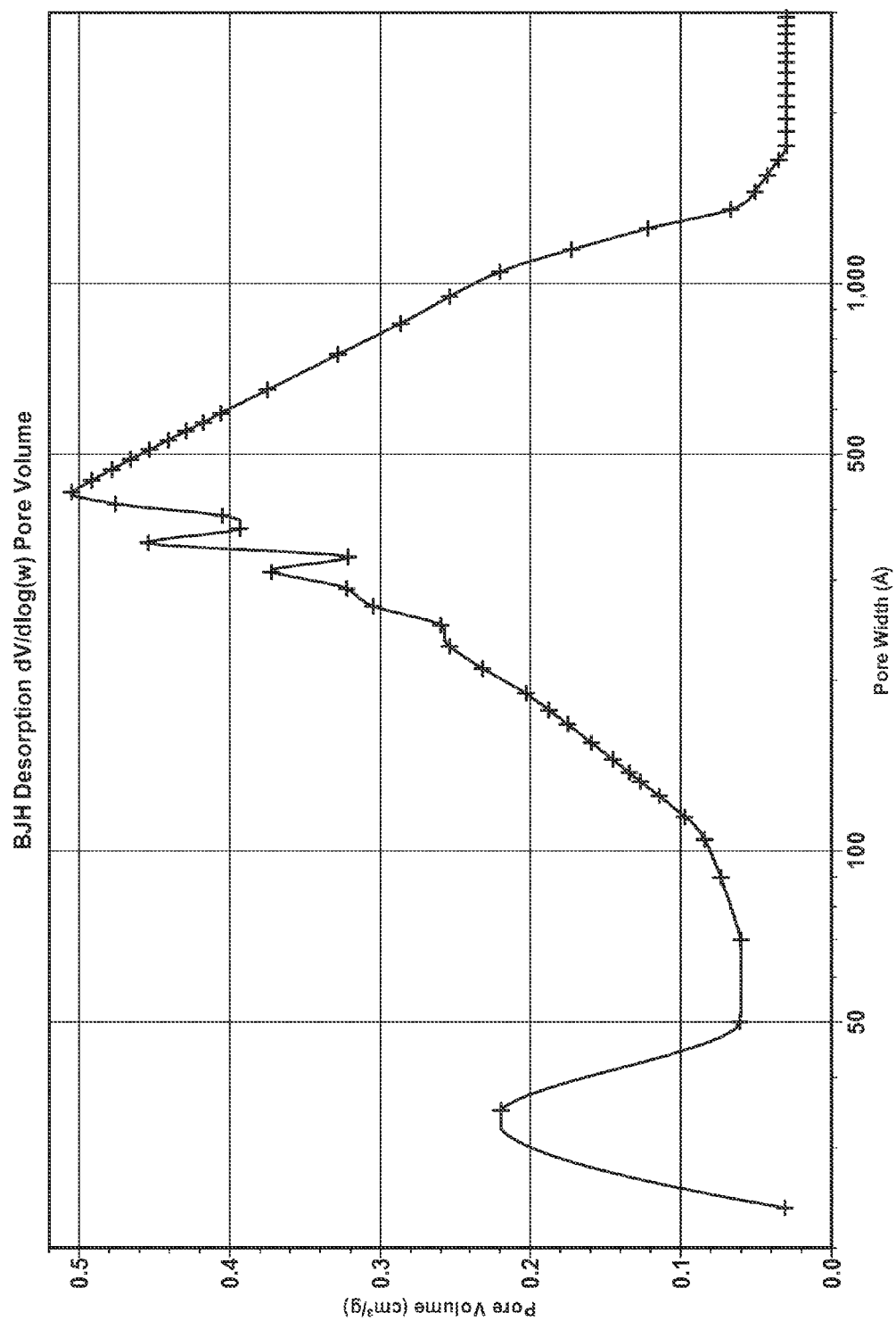
FIG. 4 shows a derivative log plot of pore size distribution for the composition of Comparative Example 1 after calcination at 900° C. for 2 hours.

FIG. 3. shows an X-Ray diffractogram of powder corresponding to the composition of Comparative Example 1, after calcination at 1200° C. for 5 hours. Only two crystalline phases are visible, corresponding to Theta alumina and a cubic phase typical from a solid solution between Cerium and zirconium.

Example 2

The composite oxide of Example 2, contained, based on 100 pbw of the composite oxide, 50 pbw $Al_2O_3$, 28 pbw $CeO_2$, 18 pbw $ZrO_2$, 1.8 pbw $La_2O_3$, 2 pbw $Y_2O_3$ and 0.2 pbw $Pr_6O_{11}$, and was made according to the method described in Example 1.

Example 3

The composite oxide of Example 3, contained, based on 100 pbw of the composite oxide, 50 pbw $Al_2O_3$, 28 pbw $CeO_2$, 18 pbw $ZrO_2$, 1.8 pbw $La_2O_3$, 2 pbw $Y_2O_3$ and 0.2 pbw $Pr_6O_{11}$ and was made according to the method described in Example 1, except that the precursors were split between two solutions, these two solutions being introduced simultaneously under agitation in the reactor. Solution A was made mixing together Aluminum sulfate and half of the total solution needed for lanthanum and praseodymium. Solution B was made mixing together cerium nitrate, zirconium orthosulfate, yttrium nitrate, half of the total solution needed for lanthanum and praseodymium and 52 g of water. Solution A and B were introduced simultaneously in the reactor together with sodium hydroxide.

Example 4

The composite oxide of Example 4 contained, based on 100 pbw of the composite oxide, 67 pbw $Al_2O_3$, 16 pbw $CeO_2$, 13 pbw $ZrO_2$, 1.8 pbw $La_2O_3$, 2 pbw $Y_2O_3$ and 0.2 pbw $Pr_6O_{11}$ and was made according to the method described above in Example 3, except for the two following differences: Solution A contained two third of the total solution needed for lanthanum and praseodymium, and hydrogen peroxide (concentration 35 wt % as $H_2O_2$) was added in solution B so the molar ratio $H_2O_2/CeO_2$ was equal to 3.

Example 5

The composite oxide of Example 5, contained, based on 100 pbw of the composite oxide, 33 pbw $Al_2O_3$, 36 pbw $CeO_2$, 27 pbw $ZrO_2$, 1.8 pbw $La_2O_3$, 2 pbw $Y_2O_3$ and 0.2 pbw $Pr_6O_{11}$, and was made according to the method described in Example 1, except for the addition of hydrogen peroxide (concentration 35 wt % as $H_2O_2$) in the acidic solution prior to the precipitation. The quantity of hydrogen peroxide was set so the molar ratio $H_2O_2/CeO_2$ was equal to 3.

Example 6

The composite oxide of Example 6 contained, based on 100 pbw of the composite oxide, 47 pbw $Al_2O_3$, 30 pbw $CeO_2$, 19 pbw $ZrO_2$, 1.8 pbw $La_2O_3$, 2 pbw $Y_2O_3$ and 0.2 pbw $Pr_6O_{11}$ and was made using the following precursors aqueous solutions: sodium aluminate (24.9 wt % as Al2O3), cerium nitrate (26.9 wt % as $CeO_2$), zirconium nitrate (21.3 wt % as $ZrO_2$), yttrium nitrate (13.9 wt % as $Y_2O_3$) and a solution containing a mixture of lanthanum nitrate and praseodymium nitrate (total oxide content 27 wt % as $La_2O_3$ and $Pr_6O_{11}$, with a ratio $La_2O_3/Pr_6O_{11}$ of 90/10 by weight).

Solution A was made mixing together cerium nitrate, zirconium nitrate, yttrium nitrate, the solution containing a mixture of lanthanum nitrate and praseodymium nitrate, 12.7 g of concentrated nitric acid (concentration 69 wt % as HNO3), hydrogen peroxide (concentration 35 wt % as $H_2O_2$) and 104 g of deionized water. The quantity of hydrogen peroxide was set so the molar ratio $H_2O_2/CeO_2$ was equal to 3. Solution B was made by mixing the sodium aluminate with the same amount of deionized water. The temperature in the reactor was maintained at 65° C. from the beginning of precipitation to the filtration. Some deionized water was added to a heated 1 liter reactor equipped with an agitation mobile. Solution A was introduced under agitation in the reactor in 50 minutes. During introduction of solution A, pH was regulated at a value of 7.3 by the introduction in the reactor of solution B. After the addition of all solution A, the flow of solution B was maintained so the pH reached a value of 10 in 10 minutes. The rest of the process was conducted as described above in Example 1.

Example 7

The composite oxide of Example 7 contained, based on 100 pbw of the composite oxide, 67 pbw $Al_2O_3$, 16 pbw $CeO_2$, 13 pbw $ZrO_2$, 1.8 pbw $La_2O_3$, 2 pbw $Y_2O_3$ and 0.2 pbw $Pr_6O_{11}$ and was made according to the method described in Example 6, except that the quantities of nitric acid and water in solution A were respectively 44 g and 60 g.

Example 8

The composite oxide of Example 8 contained, based on 100 pbw of the composite oxide, 33 pbw $Al_2O_3$, 36 pbw $CeO_2$, 27 pbw $ZrO_2$, 1.8 pbw $La_2O_3$, 2 pbw $Y_2O_3$ and 0.2 pbw $Pr_6O_{11}$, and was made according to the method described in Example 1, except that zirconium nitrate (21.3 wt % as $ZrO_2$) was used instead of zirconium orthosulfate.

Example 9

The composite oxide of Example 9 contained, based on 100 pbw of the composite oxide, 33 pbw $Al_2O_3$, 36 pbw $CeO_2$, 27 pbw $ZrO_2$, 1.8 pbw $La_2O_3$, 2 pbw $Y_2O_3$ and 0.2 pbw $Pr_6O_{11}$, and was made according to the method described in Example 8, except for the addition of hydrogen peroxide (concentration 35 wt % as $H_2O_2$) in the acidic solution prior to the precipitation. The quantity of hydrogen peroxide was set so the molar ratio $H_2O_2/CeO_2$ was equal to 3.

Example 10

The composite oxide of Example 10 contained, based on 100 pbw of the composite oxide, 67 pbw $Al_2O_3$, 16 pbw $CeO_2$, 13 pbw $ZrO_2$, 1.8 pbw $La_2O_3$, 2 pbw $Y_2O_3$ and 0.2 pbw $Pr_6O_{11}$, and was made according to the method described in Example 9.

Example 11

The composite oxide of Example 11 contained, based on 100 pbw of the composite oxide, 33 pbw $Al_2O_3$, 36 pbw $CeO_2$, 27 pbw $ZrO_2$, 1.8 pbw $La_2O_3$, 2 pbw $Y_2O_3$ and 0.2 pbw $Pr_6O_{11}$, and was made using the following precursors aqueous solutions: aluminum sulfate (concentration 8.3 wt % as $Al_2O_3$), sodium aluminate (24.9 wt % as Al2O3), cerium nitrate (26.9 wt % as $CeO_2$), zirconium orthosulfate (17.2 wt % as $ZrO_2$), yttrium nitrate (13.9 wt % as $Y_2O_3$) and a solution containing a mixture of lanthanum nitrate and praseodymium nitrate (total oxide content 27 wt % as $La_2O_3$ and $Pr_6O_{11}$, with a ratio $La_2O_3/Pr_6O_{11}$ of 90/10 by weight).

Solution A was made by mixing the aluminum sulfate and two third of the solution containing a mixture of lanthanum nitrate and praseodymium nitrate. Solution B was made mixing together cerium nitrate, zirconium orthosulfate, yttrium nitrate and one third of the solution containing a mixture of lanthanum nitrate and praseodymium nitrate. The temperature in the reactor was maintained at 65° C. from the beginning of precipitation to the filtration. Some deionized water was added to a heated 1 liter reactor equipped with an agitation mobile. Solution A was introduced under agitation in the reactor in 25 minutes. During introduction of solution A, pH was regulated at a value of 7.3 by the introduction in the reactor of the sodium aluminate solution. After the addition of all solution A, the flow of sodium aluminate was maintained so the pH reached a value of 9.3 in 10 minutes. The pH was then decreased to pH 4 with diluted nitric acid. Then, solution B was introduced in the reactor in 20 minutes. During introduction of solution B, pH was regulated at a value of 4 by the introduction in the reactor of ammonia (concentration 10 wt % as $NH_4OH$). After the addition of all solution B, the flow of ammonia was maintained so the pH reached a value of 8.2 in 25 minutes. The rest of the process was conducted as described above in Example 1.

Figure 5:
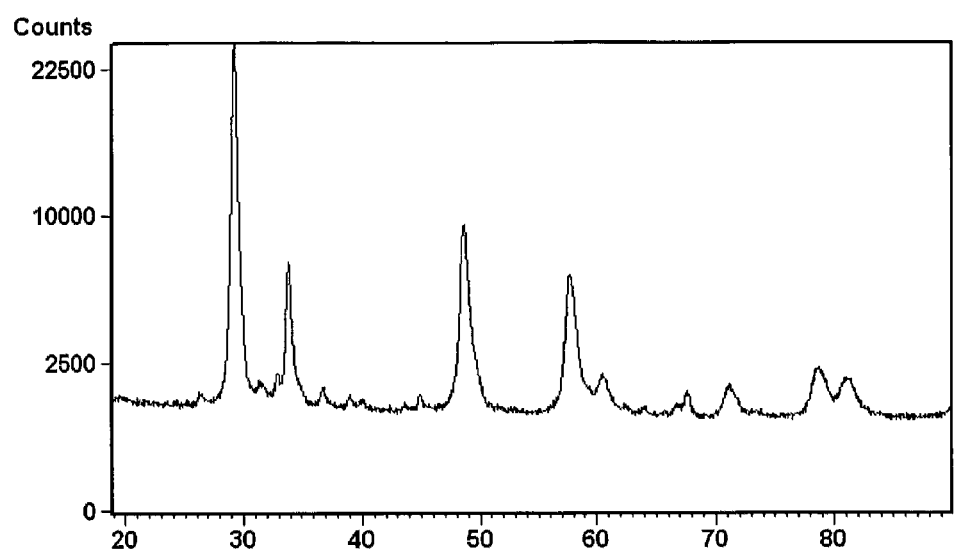
FIG. 5 shows an X-Ray diffractogram of composition of Example 11 after calcination at 1200° C. for 10 hours.
Figure 6:
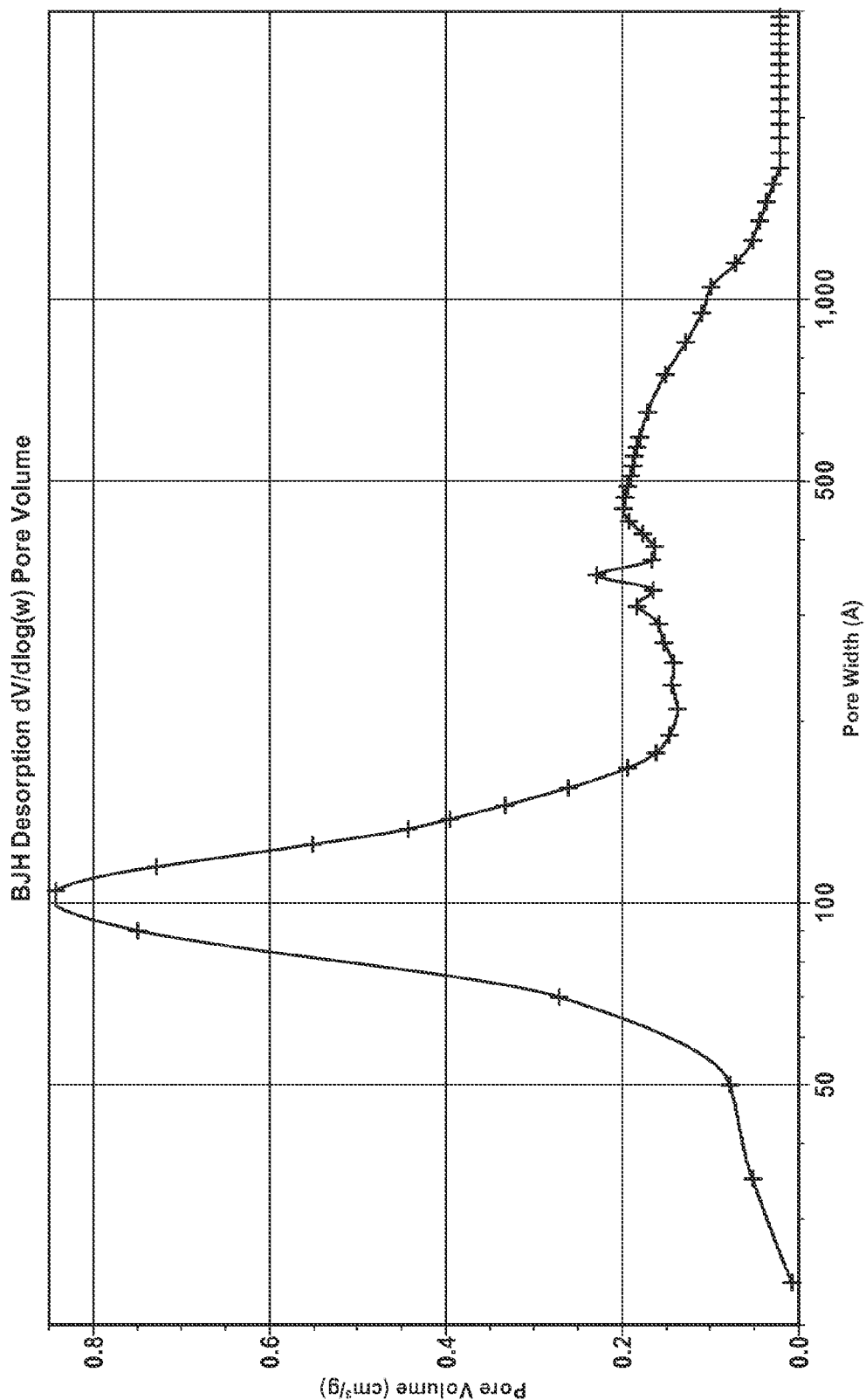
FIG. 6 shows a derivative log plot of pore size distribution for the composition of Example 11 after calcination at 900° C. for 2 hours.
Figure 7:
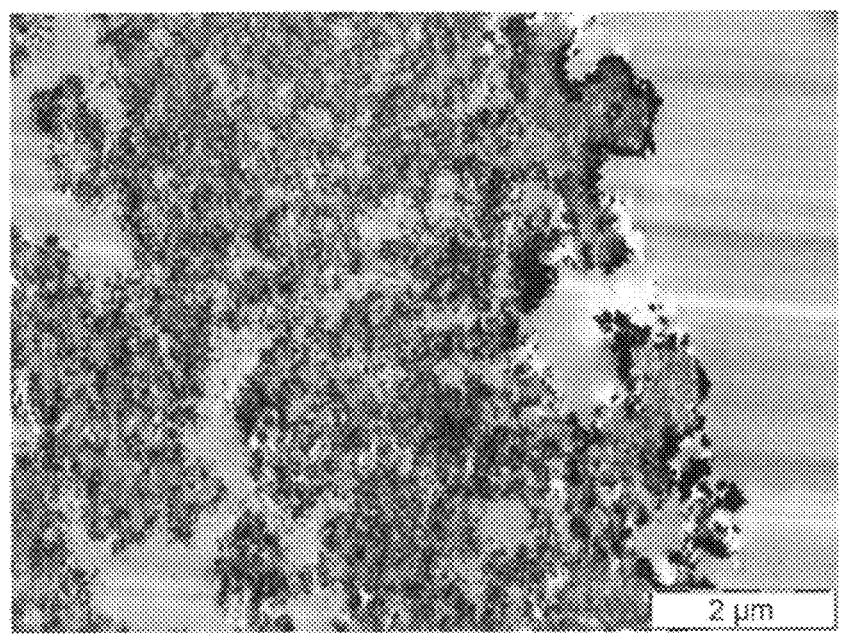
FIG. 7 shows Transmission Electron Microscopy images of the composition of Example 11 at low magnification (including a 2 micrometer (μm) reference scale) after calcination at 900° C. for 2 hours.
Figure 8:
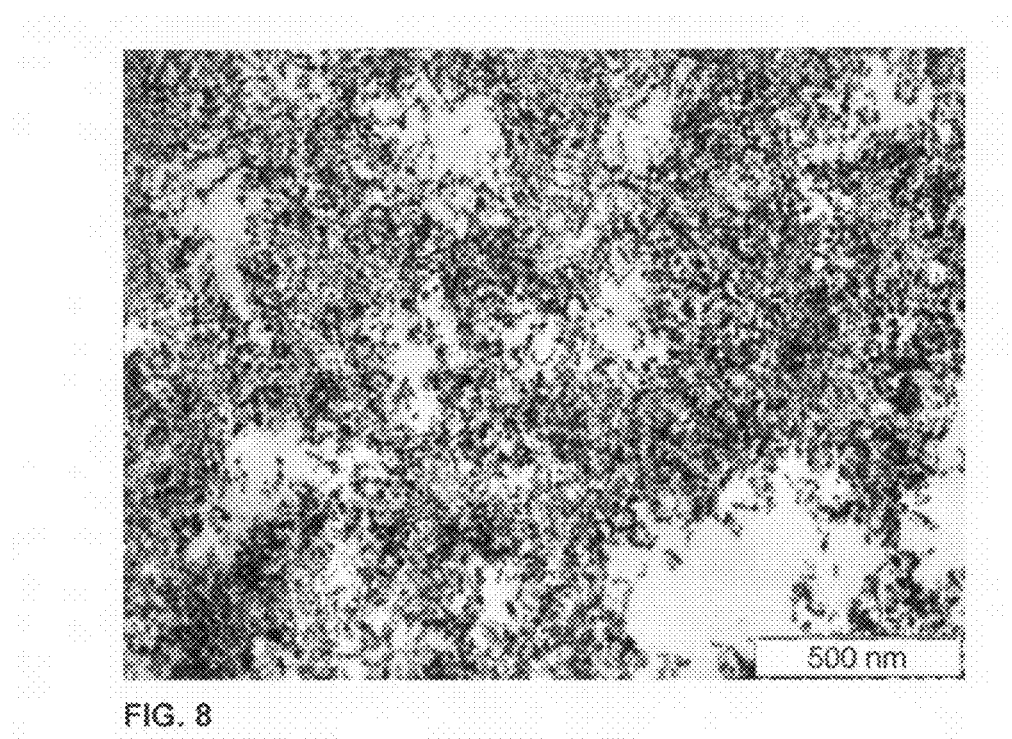
FIG. 8 shows Transmission Electron Microscopy images of the composition of Example 11 at high magnification (including a 500 nanometer (nm) reference scale) after calcination at 900° C. for 2 hours.

FIG. 5. shows an X-Ray diffractogram of powder corresponding to the composition of Example 11 after calcination at 1200° C. for 10 hours. Only two crystalline phases are visible, corresponding to Theta alumina and a cubic phase typical from a solid solution between cerium and zirconium. A derivative log plot of pore size distribution of the composition of Example 11 after calcination at 900° C. for 2 hours is shown in FIG. 6. FIG. 7. and FIG. 8. are images from an analysis of the calcined sample of the composition of Example 11 by Transmission Electron Microscope and show the dispersion of the cerium-zirconium mixed oxide nanoparticles on the alumina aggregates.

Example 12

The composite oxide of Example 12 contained, based on 100 pbw of the composite oxide, 50 pbw $Al_2O_3$, 28 pbw $CeO_2$, 18 pbw $ZrO_2$, 1.8 pbw $La_2O_3$, 2 pbw $Y_2O_3$ and 0.2 pbw $Pr_6O_{11}$, and was made using the following precursors aqueous solutions: sodium aluminate (24.9 wt % as Al2O3), cerium nitrate (26.9 wt % as $CeO_2$), zirconium nitrate (21.3 wt % as $ZrO_2$), yttrium nitrate (13.9 wt % as $Y_2O_3$) and a solution containing a mixture of lanthanum nitrate and praseodymium nitrate (total oxide content 27 wt % as $La_2O_3$ and $Pr_6O_{11}$, with a ratio $La_2O_3/Pr_6O_{11}$ of 90/10 by weight).

Solution A was made by mixing 53 g of concentrated nitric acid (concentration 69 wt % as $HNO_3$), 110 g of deionized water and half of the solution containing a mixture of lanthanum nitrate and praseodymium nitrate. Solution B was made mixing together cerium nitrate, zirconium nitrate, yttrium nitrate, hydrogen peroxide (concentration 35% wt as $H_2O_2$) and half of the solution containing a mixture of lanthanum nitrate and praseodymium nitrate. The quantity of hydrogen peroxide was set so the molar ratio $H_2O_2/CeO_2$ was equal to 3. The temperature in the reactor was maintained at 65° C. from the beginning of precipitation to the filtration. Some deionized water was added to a heated 1 liter reactor equipped with an agitation mobile. Solution A was introduced under agitation in the reactor in 25 minutes. During introduction of solution A, pH was regulated at a value of 7.3 by the introduction in the reactor of the sodium aluminate solution. After the addition of all solution A, the flow of sodium aluminate was maintained so the pH reached a value of 9.8 in 10 minutes. The pH was then decreased to pH 4 with diluted nitric acid. Then, solution B was introduced in the reactor in 20 minutes. During introduction of solution B, pH was regulated at a value of 4 by the introduction in the reactor of ammonia (concentration 10 wt % as $NH_4OH$). After the addition of all solution B, the flow of ammonia was maintained so the pH reached a value of 8.2 in 25 minutes. The rest of the process was conducted as described above in Example 1.

Figure 9:
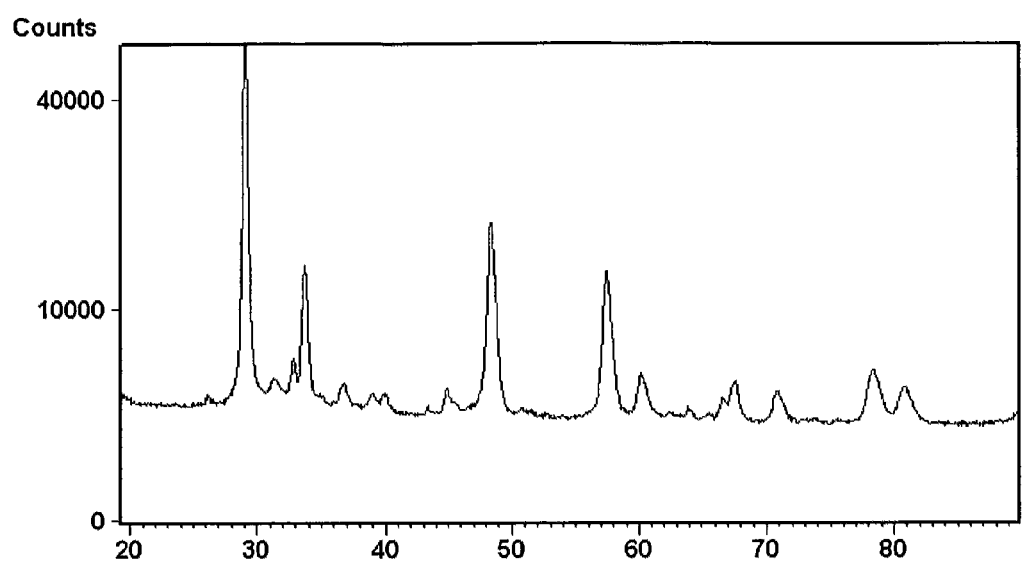
FIG. 9 shows an X-Ray diffractogram of the composition of Example 12 after calcination at 1200° C. for 5 hours.
Figure 10:
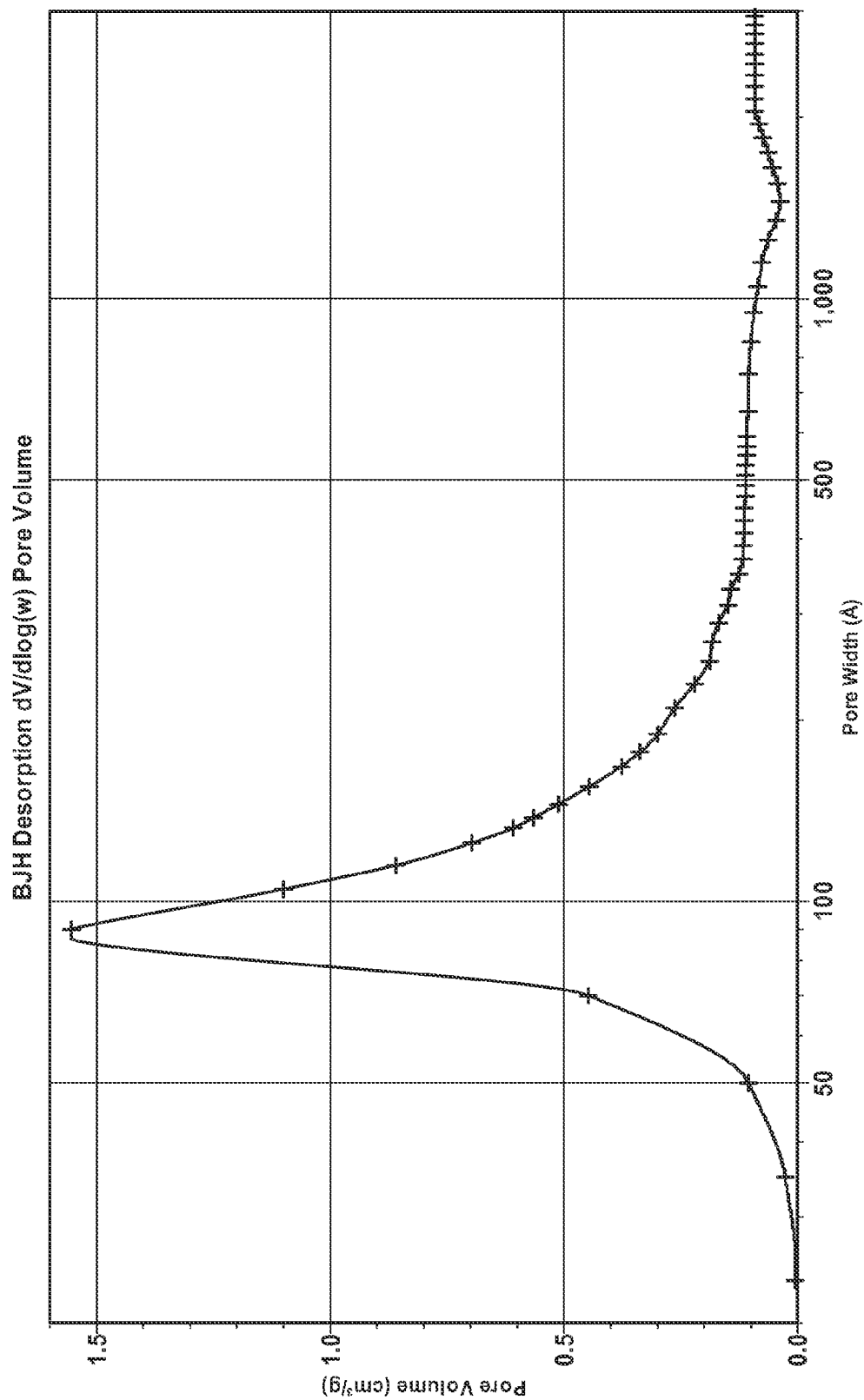
FIG. 10 shows a derivative log plot of pore size distribution for the composition of Example 12 after calcination at 900° C. for 2 hours.

FIG. 9. shows an X-Ray diffractogram of powder corresponding to the composition of Example 12 after calcination at 1200° C. for 5 hours. Only two crystalline phases are visible, corresponding to Theta alumina and a cubic phase typical from a solid solution between Cerium and zirconium. A derivative log plot of pore size distribution after calcination at 900° C. for 2 hours is shown in FIG. 10.

Example 13

The composite oxide of Example 13 contained, based on 100 pbw of the composite oxide, 48 pbw $Al_2O_3$, 28 pbw $CeO_2$, 18 pbw $ZrO_2$, 3.6 pbw $La_2O_3$, 2 pbw $Y_2O_3$, and 0.4 pbw $Pr_6O_{11}$, and was made according to the method described in Example 12, except for the following differences: Solution A was made mixing together 29 g of aluminum sulfate (concentration 8.3 wt % as $Al_2O_3$), 33 g of concentrated nitric acid, 131 g of deionized water and half of the solution containing a mixture of lanthanum nitrate and praseodymium nitrate. Solution B was made mixing together cerium nitrate, zirconium nitrate, yttrium nitrate, half of the solution containing a mixture of lanthanum nitrate and praseodymium nitrate, and hydrogen peroxide (concentration 35 wt % as $H_2O_2$). The quantity of hydrogen peroxide was set so the molar ratio $H_2O_2/CeO_2$ was equal to 3. Analytical results are reported in TABLE I below.

Example 14

The composite oxide of Example 14 contained, based on 100 pbw of the composite oxide, 50 pbw $Al_2O_3$, 10 pbw $CeO_2$ and 40 pbw $ZrO_2$, and was made according to the method described above in Example 15, except for the following differences: Solution A was made mixing together 58 g of aluminum sulfate, 30 g of concentrated nitric acid and 175 g of deionized water. Solution B was made mixing together cerium nitrate, zirconium nitrate and hydrogen peroxide (concentration 35 wt % as $H_2O_2$). The quantity of hydrogen peroxide was set so the molar ratio $H_2O_2/CeO_2$ was equal to 6. During precipitation of solution A, pH was maintained at a value of 5, then raised with the sodium aluminate solution at a value of 9.5. Intermediate pH adjustment with diluted nitric acid was made at a value of 5. During addition of solution B, the pH was maintained at a value of 5. The temperature was set at 70° C. from precipitation of solution A to the filtration. Calcination of the spray dried material was conducted at 930° C. during 2 hours.

Example 15

Figure 11:
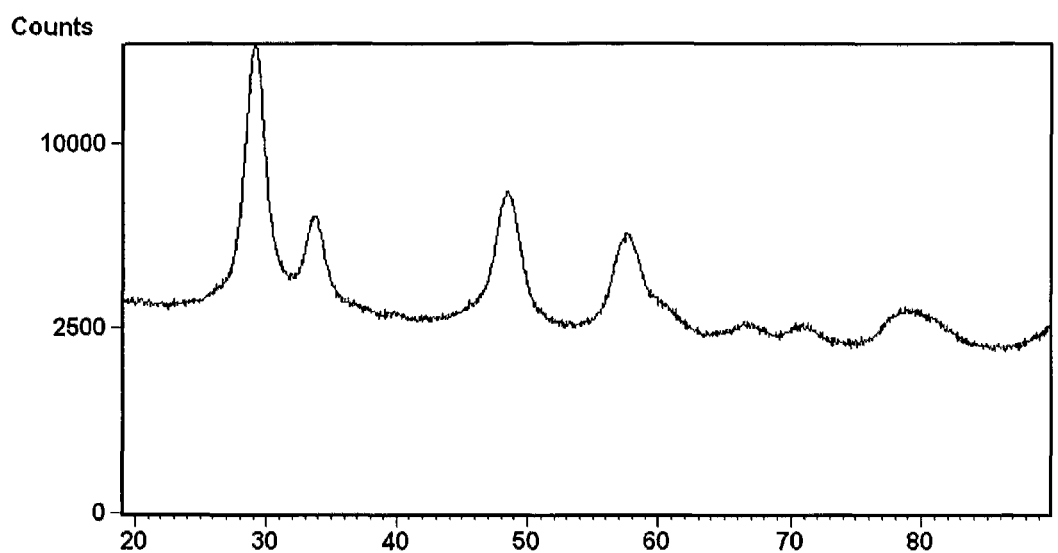
FIG. 11 shows an X-Ray diffractogram of the composition of Example 15 after calcination at 900° C. for 2 hours.
Figure 12:
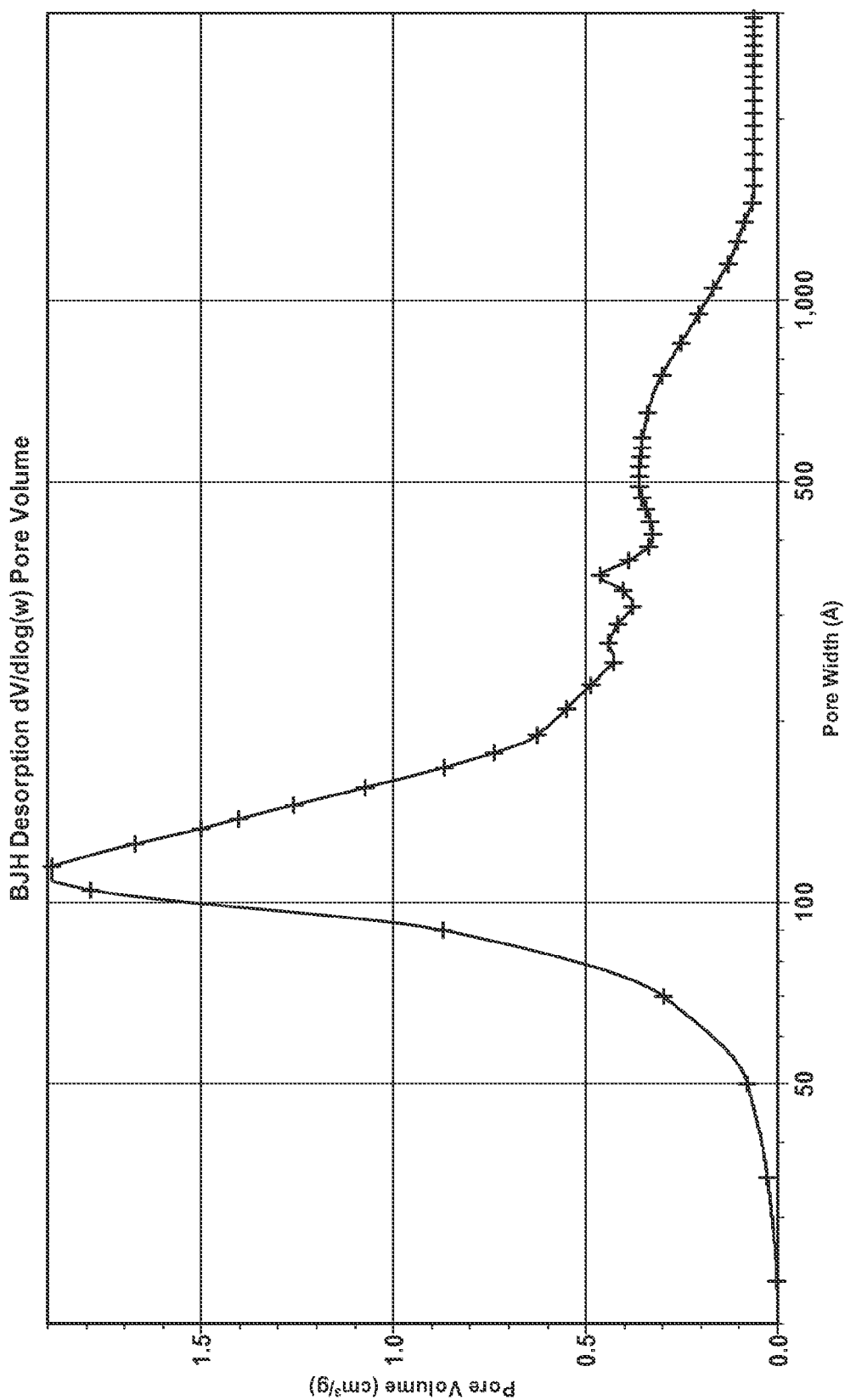
FIG. 12 shows a derivative log plot of pore size distribution for the composition of Example 15 after calcination at 900° C. for 2 hours.

The composite oxide Example 15 contained, based on 100 pbw of the composite oxide, 50 pbw $Al_2O_3$, 29 pbw $CeO_2$ and 21 pbw $ZrO_2$ and was made according to the method described above in Example 16, except for the following differences: Solution A was made mixing together 48 g of aluminum sulfate, 25 g of concentrated nitric acid and 146 g of deionized water. FIG. 11. shows the X-Ray diffractogram collected on the powder corresponding to the composition of Example 15 after calcination at 900° C. for 2 hours. The crystallite size measured after the main peak of the diffractogram corresponding to the cerium-zirconium mixed oxide was 5.9 nm. A derivative log plot of pore size distribution of the composition of Example 15 after calcination at 900° C. for 2 hours is shown in FIG. 12.

Example 16

The composite oxide Example 16 contained, based on 100 pbw of the composite oxide, 30 pbw $Al_2O_3$, 31 pbw $CeO_2$, 27.5 pbw $ZrO_2$, 2.3 pbw $La_2O_3$, 5.5 pbw $Y_2O_3$, 3.4 pbw $Nd_2O_3$ and 0.3 pbw $Pr_6O_{11}$ was made according to the method described above in Example 14, except for the following differences. Solution A was made mixing together 28.9 g of aluminum sulfate, 13.3 g of concentrated nitric acid, 89 g of deionized water and half of the solution containing a mixture of lanthanum nitrate and praseodymium nitrate (total oxide content 27 wt % as $La_2O_3$ and $Pr_6O_{11}$, with a ratio $La_2O_3/Pr_6O_{11}$ of 90/10 by weight). Solution B was made mixing together cerium nitrate, zirconium nitrate, the remaining half of the solution containing a mixture of lanthanum nitrate and praseodymium nitrate, yttrium nitrate, neodymium nitrate (concentration 29.4% as $Nd_2O_3$) and hydrogen peroxide (concentration 35 wt % as $H_2O_2$). After the addition of all solution B, the flow of ammonia was maintained so the pH reached a value of 8.2 in 15 minutes.

Figure 13:
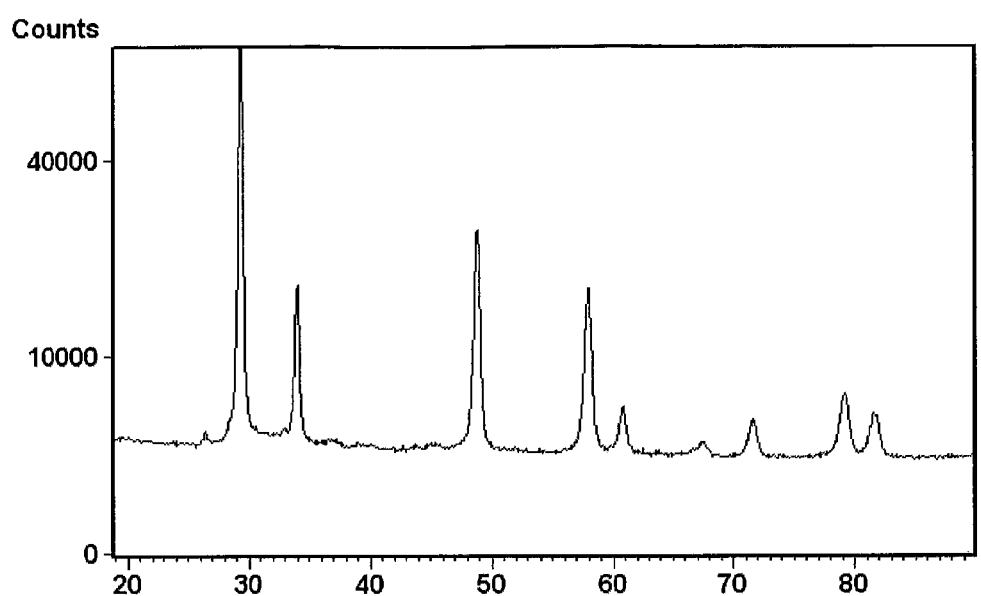
FIG. 13 shows X-Ray diffractogram collected for the composition of Example 16 after calcination at 1200° C. for 5 hours.
Figure 14:
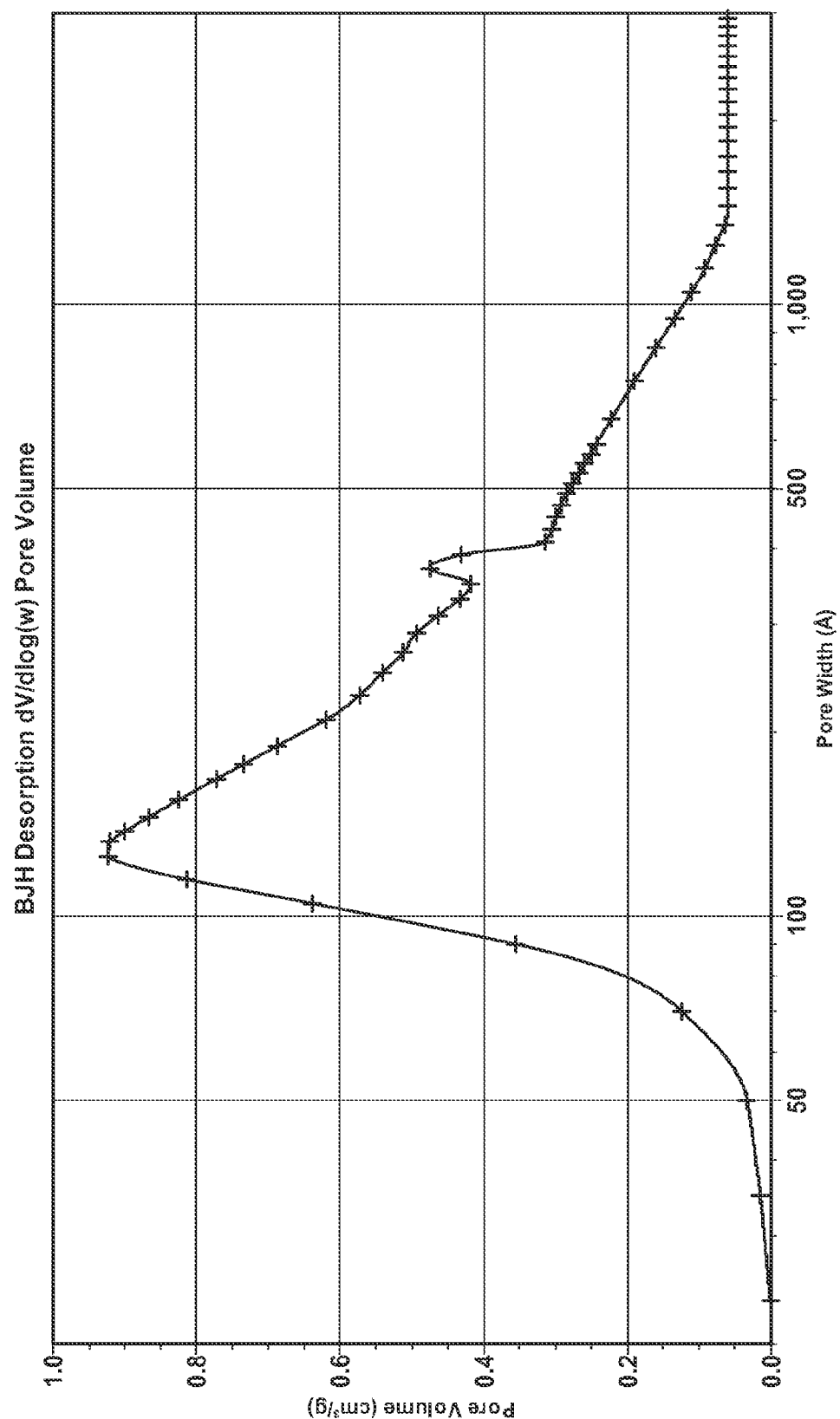
FIG. 14 shows the derivative log plot of pore size distribution for the composition of Example 16 after calcination at 900° C. for 2 hours.
Figure 15:
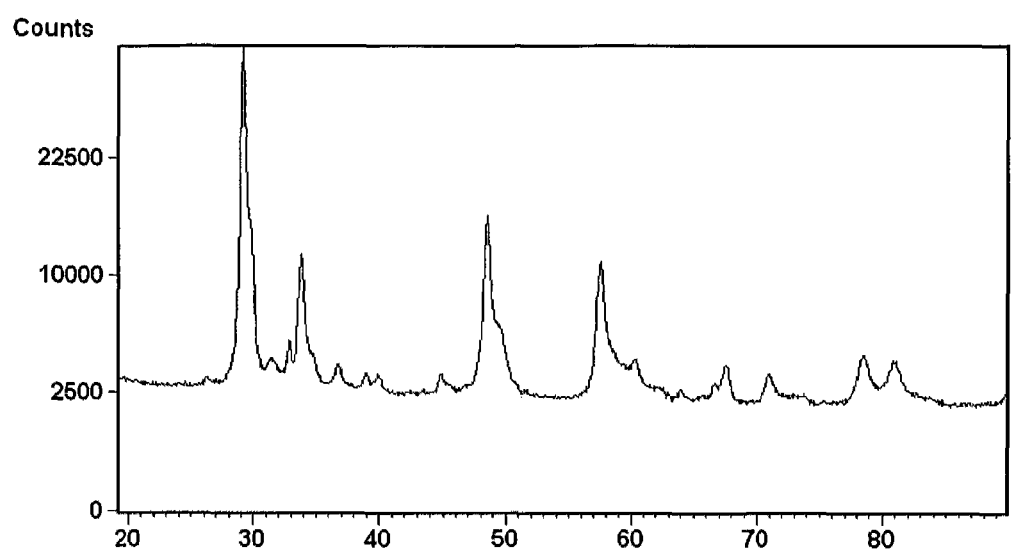
FIG. 15 shows X-Ray diffractogram collected for the composition of Example 17 after calcination at 1200° C. for 5 hours.
Figure 16:
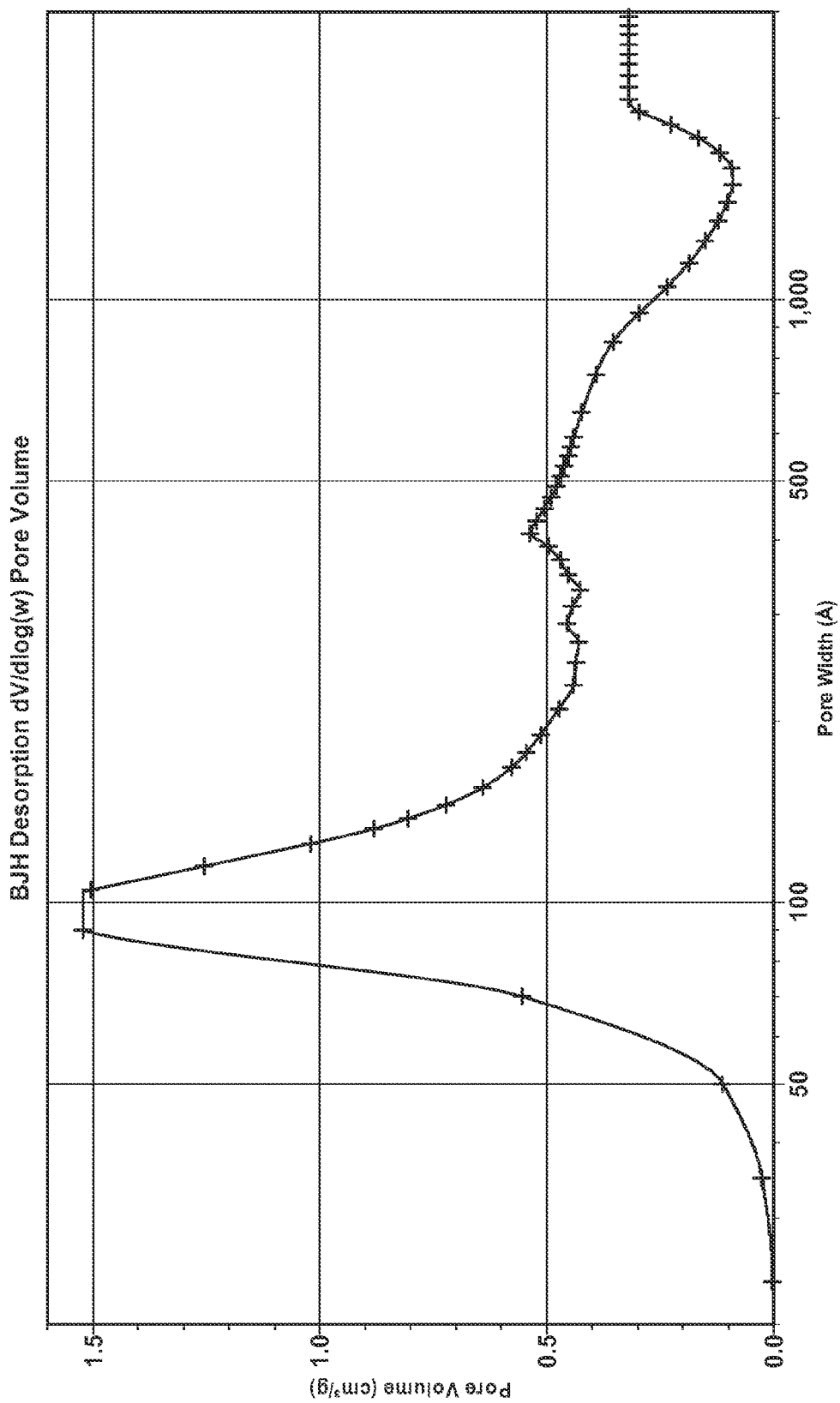
FIG. 16 shows the derivative log plot of pore size distribution for the composition of Example 17 after calcination at 900° C. for 2 hours.

FIG. 13. shows an X-Ray diffractogram collected on powder corresponding to the composition of Example 16 after calcination at 1200° C. for 5 hours. The peaks of the diffractogram corresponding to the cerium-zirconium mixed oxides are characterized by the existence of a shoulder, especially visible for the peak at 2 theta equal 49.5°. The shoulder is evidence for a phase partitioning of the cerium-zirconium mixed oxide resulting from ageing at high temperature. A derivative log plot of pore size distribution of the composition of Example 16 after calcination at 900° C. for 2 hours is shown in FIG. 14.

Example 17

The composite oxide Example 17 contained, based on 100 pbw of the composite oxide, 46.2 pbw $Al_2O_3$, 26.3 pbw $CeO_2$, 24.2 pbw $ZrO_2$ and 3.3 pbw $Pr_6O_{11}$, and was made according to the method described above in Example 16, except for the following differences. Solution A was made mixing together 45 g of aluminum sulfate, 22 g of concentrated nitric acid, 138 g of deionized water and one third of all the Praseodymium nitrate solution (concentration 27 wt % as $Pr_6O_{11}$). The temperature was set at 65° C. from the precipitation of solution A to the filtration. During precipitation of Solution B, pH was maintained at a value of 5.5. Calcination of the spray dried material was conducted at 850° C. during 4 hours.

FIG. 13. shows a X-Ray diffractogram for powder corresponding to the composition of Example 17 after calcination at 1200° C. for 5 hours. Only two crystalline phases are visible, corresponding to Theta alumina and a cubic phase typical from a solid solution between cerium and zirconium. A derivative log plot of pore size distribution of the composition of Example 17 after calcination at 900° C. for 2 hours is shown in FIG. 14.

Example 18

The composite oxide of Example 18 contained, based on 100 pbw of the composite oxide, 50 pbw $Al_2O_3$ and 50 pbw $ZrO_2$, and was made using the following precursors aqueous solutions: sodium aluminate (24.9 wt % as $Al_2O_3$), aluminum sulfate (8.3 wt % as $Al_2O_3$) and zirconium nitrate (21.3 wt % as $ZrO_2$). Solution A was made mixing together zirconium nitrate, 46 g of aluminum sulfate and 46 g of deionized water. The temperature in the reactor was maintained at 65° C. from the beginning of precipitation to the filtration. Some deionized water was added to a heated 1 liter reactor equipped with an agitation mobile. 14 g of solution A were first added to the reactor in 5 minutes. After 5 minutes under agitation with no further addition of reactive, Solution A was introduced under agitation in the reactor in 50 minutes. During introduction of solution A, pH was regulated at a value of 9 by the introduction in the reactor of sodium aluminate solution. After the addition of all solution A, the flow of sodium aluminate solution was maintained so the pH reached a value of 9.8 in 8 minutes. The rest of the process was conducted as described above in Example 1. Phase analysis by X-Ray diffraction of the composition of Example 18 after calcination at 1100° C. for 5 hours showed only pure tetragonal zirconia and theta alumina.

Example 19

The composite oxide Example 19 contained, based on 100 pbw of the composite oxide, 90 pbw $Al_2O_3$, 7.4 pbw $ZrO_2$ 0.5 pbw $La_2O_3$, 1.4 pbw $Y_2O_3$ and 0.7 pbw $Nd_2O_3$, and was made using the following precursors aqueous solutions: sodium aluminate (24.9 wt % as Al2O3), aluminum sulfate (8.3 wt % as $Al_2O_3$), zirconium nitrate (21.3 wt % as $ZrO_2$), yttrium nitrate (13.9 wt % as $Y_2O_3$), neodymium nitrate (21.3 wt % as $Nd_2O_3$), and lanthanum nitrate (27.2 wt % as $La_2O_3$).

Solution A was made mixing together 141 g of aluminum sulfate, lanthanum nitrate, yttrium nitrate, neodymium nitrate, zirconium nitrate and 141 g of deionized water. Solution B was sodium aluminate solution. The temperature in the reactor was maintained at 65° C. from the beginning of precipitation to the filtration. Some deionized water was added to a heated 1 liter reactor equipped with an agitation mobile. 12 g of solution A were first added to the reactor in 5 minutes. After 5 minutes under agitation with no further addition of reactive, solution A was introduced under agitation in the reactor in 30 minutes. During introduction of solution A, pH was regulated at a value of 5 by the introduction in the reactor of solution B. After the addition of all solution A, the flow of solution B was maintained so the pH reached a value of 9.8 in 25 minutes. pH was than adjusted to 9 with diluted nitric acid. The rest of the process was conducted as described above in Example 1. Phase analysis by X-Ray diffraction of the composition of Example 19 after calcination at 1200° C. for 5 hours showed only pure cubic zirconia and theta alumina.

Example 20

The composite oxide of Example 20 contained, based on 100 pbw of the composite oxide, 75 pbw $Al_2O_3$, 18.5 pbw $ZrO_2$ 1.3 pbw $La_2O_3$, 3.5 pbw $Y_2O_3$ and 1.8 pbw $Nd_2O_3$, and was made according to the method described above in Example 21, except that solution A was made mixing together 141 g of aluminum sulfate, lanthanum nitrate, yttrium nitrate, neodymium nitrate, zirconium nitrate and 141 g of deionized water. Phase analysis by X-Ray diffraction of the composition of Example 20 after calcination at 1200° C. for 5 hours showed only pure cubic zirconia and theta alumina.

TABLE I

| EX # | SA ($m^2$/g) | PV ($cm^3$/g) | APD (nm) | SA 1100/5 h ($m^2$/g) | SA 1200/5 h ($m^2$/g) | Fcryst 1200/5 h (nm) |
|---|---|---|---|---|---|---|
| C1 | 69 | 0.37 | 18 | 26 | 15 | 21 |
| 1 | 105 | 0.55 | | 38 | 18 | 21 |
| 2 | 168 | 0.85 | | 55 | 34 | 22 |
| 3 | 158 | 0.71 | | 58 | 37 | 22 |
| 4 | 180 | 0.72 | | 66 | | 23 |
| 5 | 103 | 0.53 | | 42 | 19 | 22 |
| 6 | 132 | 0.67 | | 58 | 29 | 21 |
| 7 | 177 | 0.79 | | 76 | | 18 |
| 8 | 104 | 0.77 | | 44 | 24 | — |
| 9 | 99 | 0.43 | | 43 | 21 | 35 |
| 10 | 170 | 0.87 | | 71 | 36 | 23 |
| 11 | 91 | 0.39 | | 38 | 15 | 17 |
| 12 | 141 | 0.54 | | 59 | 24 | 23 |
| 13 | 160 | 0.67 | | 67 | 22 | 22 |
| 14 | 128 (930/2 h) | 0.8 (930/2 h) | — | 65 | 22 | — |
| 15 | 174 | 0.83 | 14.5 | 59 | 26 | — |
| 16 | 101 | 0.57 | 16.9 | 41 | 16 | 30 |
| 17 | 170 | 0.86 | — | 56 | 22.8 | — |
| 18 | 139 | 0.8 | — | 53 | — | — |
| 19 | 219 | 1.56 | 22.2 | 100 | 53 | 16 |
| 20 | 167 | 1.05 | 19.2 | 73 | 40 | 29 |

The invention claimed is:

1. A porous inorganic composite oxide, comprising oxides of aluminum and cerium, or oxides of aluminum and zirconium, or oxides of aluminum, cerium, and zirconium, and, optionally, one or more oxides of dopants selected from transition metals, rare earths, and mixtures thereof, said inorganic composite oxide having:
   (a) a specific surface area after calcining at 1100° C. for 5 hours of greater than or equal to that calculated according to Equation (2):

$$SA=0.8235[Al]+11.157 \qquad (Eq.\ 2)$$

wherein:
   SA is the BET specific surface area of the inorganic composite oxide, in square meters per gram, and
   [Al] is the amount of oxides of aluminum in the composite oxide, expressed as pbw $Al_2O_3$ per 100 pbw of the composite oxide, and
   (b) a total pore volume after calcining at 900° C. for 2 hours of greater than or equal to that calculated according to Equation (4.1):

$$PV=0.0097[Al]+0.0647 \qquad (Eq.\ 4.1)$$

wherein:
   PV is the pore volume of the inorganic composite oxide, in cubic centimeters per gram, and
   [Al] is as defined above in regard to Equation (2).

2. The composite oxide of claim 1, wherein the composite oxide comprises, each in an amount, expressed in parts by weight of discrete binary oxide of the respective element per 100 parts by weight of the composite oxide, of:
   (a) from about 20 to about 98 parts by weight $Al_2O_3$, and
   (b)(i) from about 2 to about 80 parts by weight $ZrO_2$, or
   (b)(ii) from about 2 to about 80 parts by weight $CeO_2$, or
   (b)(iii) from about 2 to less than 78 parts by weight $ZrO_2$, and from 2 to 78 parts by weight $CeO_2$, provided that the combined amount of $ZrO_2$ and $CeO_2$ does not exceed 80 parts by weight, and
   (c) optionally, up to about 15 parts by weight of oxides of one or more dopants selected from transition metals, rare earths, and mixtures thereof.

3. The composite oxide of claim 2, wherein the composite oxide comprises oxides of one or more dopants.

4. The composite oxide of claim 3, wherein the composite oxide comprises oxides of aluminum and a lanthanum, wherein, with the amounts of oxides of aluminum and lanthanum in the composite oxide each expressed as an amount of discrete binary oxide of the respective element, the amount of $La_2O_3$ is greater than or equal to 2 parts by weight per 100 parts by weight $Al_2O_3$.

5. The composite oxide of claim 4, wherein the composite oxide comprises oxides of aluminum, zirconium, cerium and a yttrium, wherein, with the amounts of oxides of zirconium, cerium, and yttrium each expressed as an amount of discrete binary oxide of the respective element, the amount of $Y_2O_3$ is greater than or equal to 2 parts by weight per 100 parts by weight of the combined amount of $ZrO_2$ and $CeO_2$.

6. The composite oxide of claim 4, wherein the composite oxide comprises oxides of aluminum, zirconium, cerium and yttrium and further comprises at least one oxide of lanthanum, neodymium, or praseodymium, wherein, with the amounts of oxides of zirconium, cerium, and dopant elements each expressed as an amount of discrete binary oxide of the respective element:
   the combined amount of $La_2O_3$, $Nd_2O_3$, and $Pr_6O_{11}$ is greater than or equal to 2 parts by weight per 100 parts by weight $Al_2O_3$, and
   the amount of $Y_2O_3$ is greater than or equal to 2 parts by weight per 100 parts by weight of the combined amount of $ZrO_2$ and $CeO_2$.

7. The composite oxide of claim 1, wherein the composite oxide exhibits a BET specific surface area after calcining at 1200° C. for 5 hours of greater than or equal to that calculated according to Equation (3.1):

$$SA=0.3[Al]+7 \qquad (Eq. 3.1)$$

where SA and [Al] are each as defined for Equation (2).

8. The composite oxide of claim 1, wherein the composite oxide exhibits a pore volume after calcining at 900° C. for 2 hours of greater than or equal to that calculated according to Equation (4.2):

$$PV=0.0107[Al]+0.25 \qquad (Eq. 4.2)$$

wherein PV and [Al] are each as defined for Equation (4.1).

9. The composite oxide of claim 1, wherein the composite oxide comprises oxides of aluminum, cerium, and zirconium, and wherein the composite oxide optionally further comprises oxides of one or more dopants, and wherein the oxides of cerium and zirconium form a solid solution.

10. The composite oxide of claim 1, wherein the composite oxide exhibits a crystalline structure prior to calcination and retains substantially the same crystalline structure after calcining at 900° C. for 2 hours.

11. A catalyst, comprising one or more noble metals dispersed on the porous inorganic composite oxide of claim 1.

* * * * *